(12) United States Patent
Lee et al.

(10) Patent No.: US 7,499,491 B2
(45) Date of Patent: Mar. 3, 2009

(54) APPARATUS FOR ADAPTIVE MULTIPLE-DIMENTIONAL SIGNAL SEQUENCES ENCODING/DECODING

(75) Inventors: Tsu-Chang Lee, Los Altos, CA (US);
Wen-Lung Chen, Los Altos, CA (US);
Yusong Huang, Santa Clara, CA (US);
Li-Herng Yao, San Jose, CA (US);
Hsi-Sheng Chen, Fremont, CA (US)

(73) Assignee: ViChip Corp. Limited, Hsinchu (TW)

( * ) Notice: Subject to any disclaimer, the term of this patent is extended or adjusted under 35 U.S.C. 154(b) by 908 days.

(21) Appl. No.: 10/875,258

(22) Filed: Jun. 23, 2004
(Under 37 CFR 1.47)

(65) Prior Publication Data
US 2005/0111548 A1 May 26, 2005

Related U.S. Application Data

(60) Provisional application No. 60/480,985, filed on Jun. 23, 2003.

(51) Int. Cl.
*H04B 1/66* (2006.01)
*H04N 7/12* (2006.01)
*H04N 11/02* (2006.01)
*H04N 11/04* (2006.01)

(52) U.S. Cl. .................. 375/240.12; 375/240.24; 375/240.18; 375/240.2

(58) Field of Classification Search .......... 375/240.2, 375/240.12, 240.18, 240.24
See application file for complete search history.

(56) References Cited

U.S. PATENT DOCUMENTS

| | | | |
|---|---|---|---|
| 6,130,911 A * | 10/2000 | Lei | 375/240.16 |
| 6,317,819 B1 | 11/2001 | Morton | |
| 6,421,383 B2 * | 7/2002 | Beattie | 375/240.05 |
| 7,200,174 B2 * | 4/2007 | Lainema et al. | 375/240.16 |
| 2004/0114684 A1 * | 6/2004 | Karczewicz et al. | 375/240.03 |

FOREIGN PATENT DOCUMENTS

EP 0 577 418 A2 1/1994

OTHER PUBLICATIONS

PCT International Search Report re: PCT/US2004/020317, mailed Feb. 2, 2005, 8 pages.
Yang, et al., *Generalized Rate-Distortion Optimization for Motion-Compensated Video Coders*, IEEE Transactions on Circuits and Systems for Video Technology, IEEE Inc. New York, vol. 10 No. 6, Sep. 2000, pp. 942-955.
Marpe, et al., *High Performance Wavelet-Based Video Coding Using Variable Block-Size Motion Compensation and Adaptive Arithmetic Coding*, Proceedings of the Fourth Iasted International Conference Signal and Image Processing, ACTA Press Anaheim, CA, 2002, pp. 404-409.

(Continued)

*Primary Examiner*—Marsha D Banks Harold
*Assistant Examiner*—Jessica Roberts
(74) *Attorney, Agent, or Firm*—Jianq Chyun IP Office

(57) ABSTRACT

A system to process a signal sequence is described. A hybrid block matching and transform based N-Dimensional signal sequence encoder and decoder is disclosed. The encoder includes encoder side block matching predictor, which includes entropy based cost function which can be estimated from certain energy measure of the block matching difference; a fast block matching search method to learn the results from neighboring blocks and to perform large range search with only a small number of points to visit.

15 Claims, 30 Drawing Sheets

OTHER PUBLICATIONS

Wiegand et al., *Long-Term Memory Motion-Compensated Prediction*, IEEE Transactions on Circuits and Systems for Video Technology, IEEE Inc.New York, vol. 9, No. 1, Feb. 1999, pp. 70-84.

Richardson, Iain E.G, *Video Codec Design*, Developing Image and Video Compression Systems, John Wiley & Sons, 2002, England.

Harwit, et al., *Hadamard Transform Optics*, Academic Press, 1979, New York.

Widrow, et al., *Adaptive Signal Processing*, Prentice Hall, 1985, New Jersey.

Von Neumann, John, *Theory of Self-Reproducing Automata*, edited and completed by Arthur W. Burks, University of Illinois Press, 1966, Urbana and London.

Lee, Tsu-Chang, *Structure Level Adaptation for Artificial Neural Networks*, Kluwer Academic Publishers, 1991, Massachusetts.

Nils, Nilsson J., *Principles of Artificial Intelligence*, Morgan Kaufmann Publishers, Inc., 1986, California.

\* cited by examiner

Figure 2
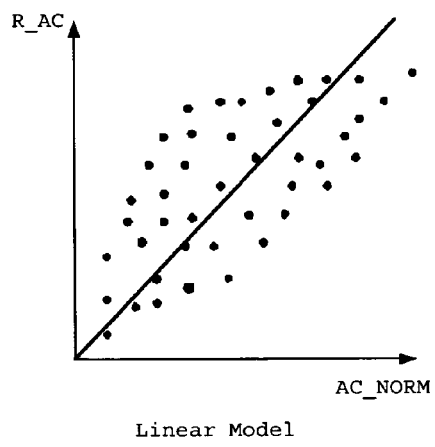
Linear Model
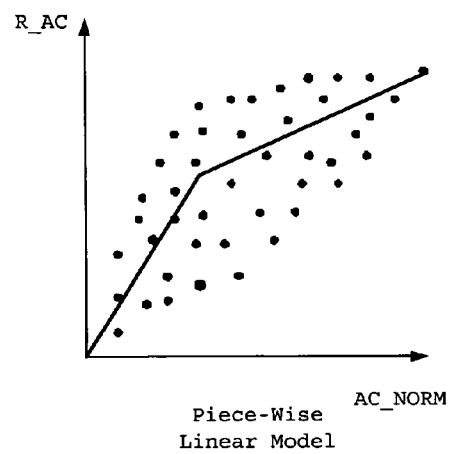
Piece-Wise
Linear Model

8x8 Block

APPARATUS FOR ADAPTIVE MULTIPLE-DIMENTIONAL SIGNAL SEQUENCES ENCODING/DECODING

The present application claims the priority benefit of U.S. provisional patent application No. 60/480,985, entitled "METHOD AND APPARATUS FOR ADAPTIVE MULTIPLE-DIMENTIONAL SIGNAL SEQUENCES ENCODING/DECODING", filed Jun. 23, 2003, the content of which is incorporated herein by reference.

FIELD OF THE INVENTION

One embodiment relates generally to data encoding, storage, distribution, and decoding, and more particularly but not exclusively, to n-dimensional signal sequence encoding, storage, distribution, and decoding by use of n-dimensional block matching method.

BACKGROUND

A video signal typically has an enormous amount of information. Thus, a video signal is typically compression-encoded before being transmitted or stored. In order to encode a video signal with high efficiency, pictures whose unit is a frame are divided into a plurality of blocks in units of a predetermined number of pixels. Orthogonal transform is performed for each block to separate the spatial frequency of a picture into frequency components. Each frequency component is obtained as a transform coefficient and encoded.

SUMMARY OF THE INVENTION

According to one aspect, a system to process a signal sequence includes a differentiator to receive a signal sequence, the signal sequence including an n-dimensional current frame including a plurality of current frame blocks and a plurality of n-dimensional reference frames, each frame from the plurality of n-dimensional reference frames including a plurality of reference frame blocks; a frame buffer to store the plurality of n-dimensional reference frames; a block matching predictor to identify a prediction block of the plurality of reference frame blocks for each block in the plurality of current frame blocks, and to determine a reference displacement index and a block prediction difference for a respective prediction block for each block in the plurality of current frame blocks, wherein the reference displacement index is to identify a point within the reference frame blocks; a block encoder to encode a respective block prediction difference and a respective reference displacement index for each block in the plurality of current frame blocks, and to thereby create a plurality of encoded blocks; and a sequence encoder to wrap the plurality of encoded blocks together in accordance with a predetermined format.

According to another aspect, a memory system includes an n-dimensional memory. The n-dimensional memory includes one or more memory slices, to allow storing or retrieving one data item into each slice during one clock cycle; means to organize n-dimensional data located within an n-dimensional frame to allow all the data within a given cube, which can be located anywhere in the n-dimensional frame, to be accessed in a number of cycles, where the number of cycles is determined as the total number of points inside the cube divided by the number of memory slices; an addressing translation module to access data from the one or more memory slices based on n-dimensional address inputs; and a data multiplexer/demultiplexer to bridge data flow from the one or more slices into one or more external processing modules utilizing n-dimensional data.

According to a further aspect, system includes a processing array including one or more signal processing units to process n-dimensional data inputs; one or more data registers, to store data for the signal processing units; means to control the processing array to allow one data element to be used by more than one processor in the array.

According to still further aspect, a method includes receiving a sequence of n-dimensional frames including an original n-dimensional frame; and scanning the sequence of n-dimensional frames into a one-dimensional sequence of blocks in such an order as to preserve neighboring relationship of blocks within the original n-dimensional frame.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements.

FIG. 2 is a diagram illustrating fitting R_AC by AC_NORM with linear model and piece-wise linear model, according to one embodiment of the present invention.

DETAILED DESCRIPTION

In the description herein, numerous specific details are provided, such as the description of system components and methods, to provide a thorough understanding of embodiments of the invention. One skilled in relevant arts will recognize, however, that the invention can be practiced without one or more of the specific details, or with other systems, methods, components, materials, parts, and the like. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Overview

Figure 27:
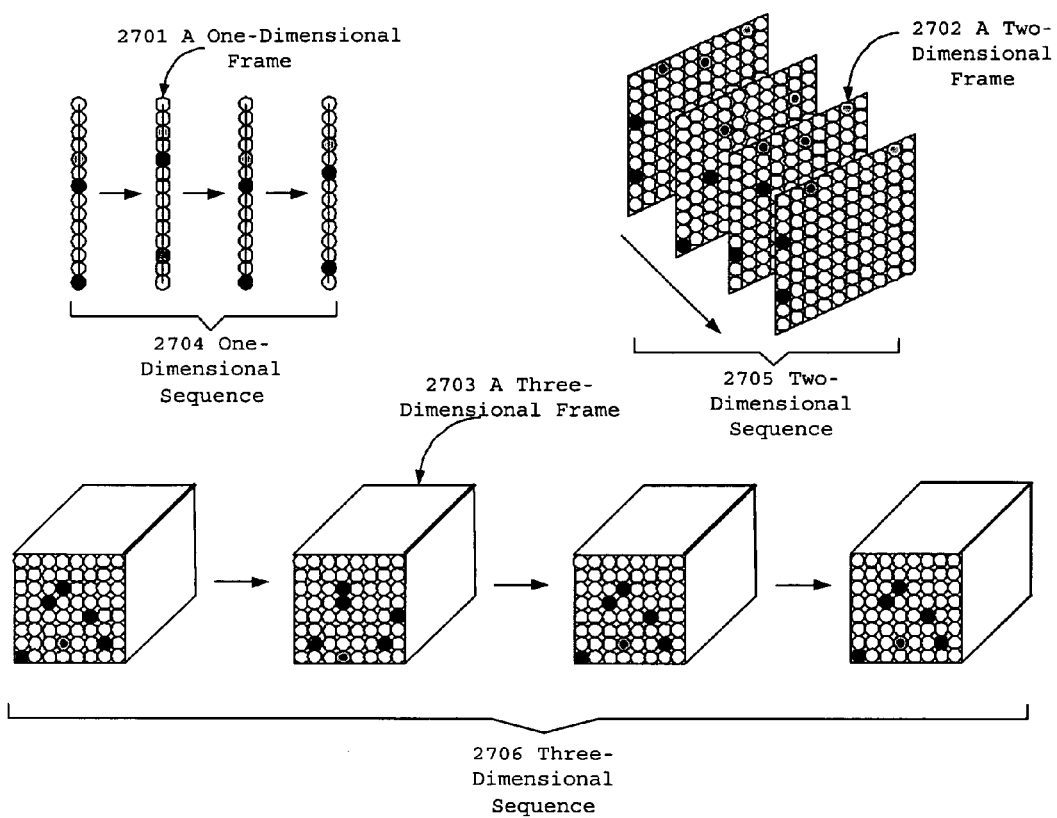
FIG. 27 is a diagram illustrating examples of n-dimensional signal sequences, according to one embodiment of the present invention.

In one embodiment, a method and apparatus to effectively compress multiple-dimensional signal sequences to reduce the bit-rate with certain distortion constraints is described. This method can be used to encode an n-dimensional signal sequence, of which FIG. 27 shows some examples. An exemplary application of this method is in video encoding for transmission and storage purposes. It will be noted, that although in most of the descriptions below, only the two dimensional video signal sequence compression is specified in details as illustrated examples, the method and apparatus taught here can be extended to compress a general sequence of n-dimensional signals.

N-Dimensional Block Matching Signal Sequence Encoding

Figure 1:
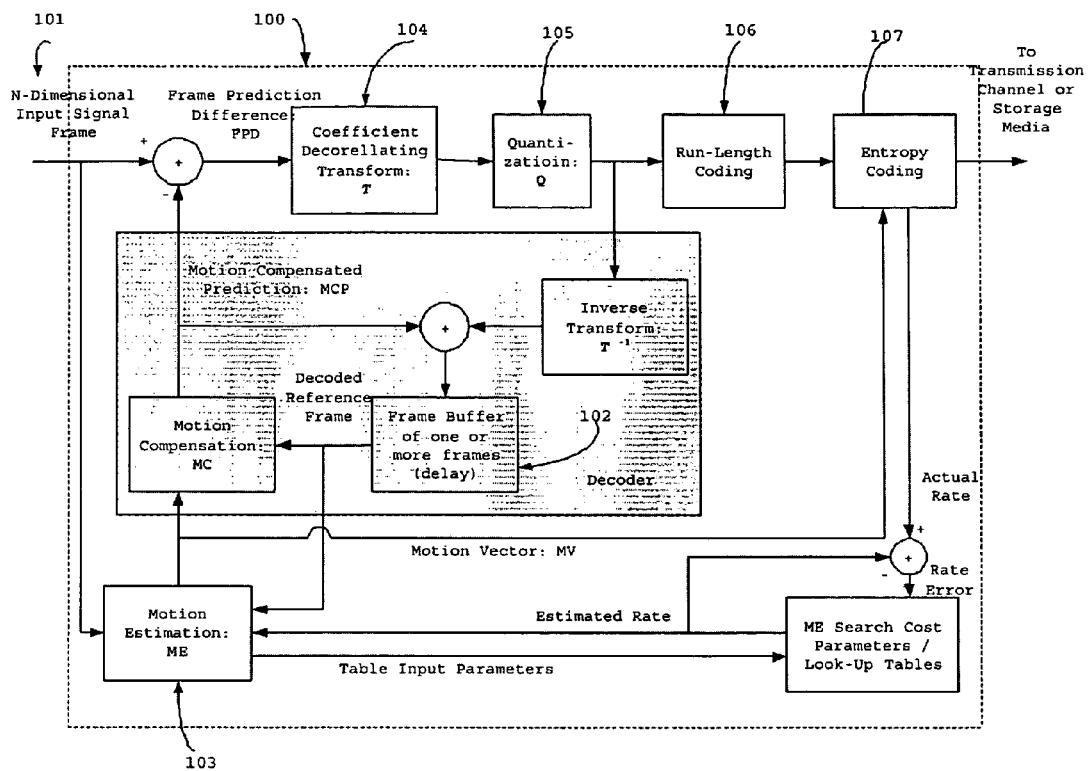
FIG. 1 is a diagram illustrating an adaptive multi-dimensional signal sequence encoding system, according to one embodiment of the present invention.
Figure 29:
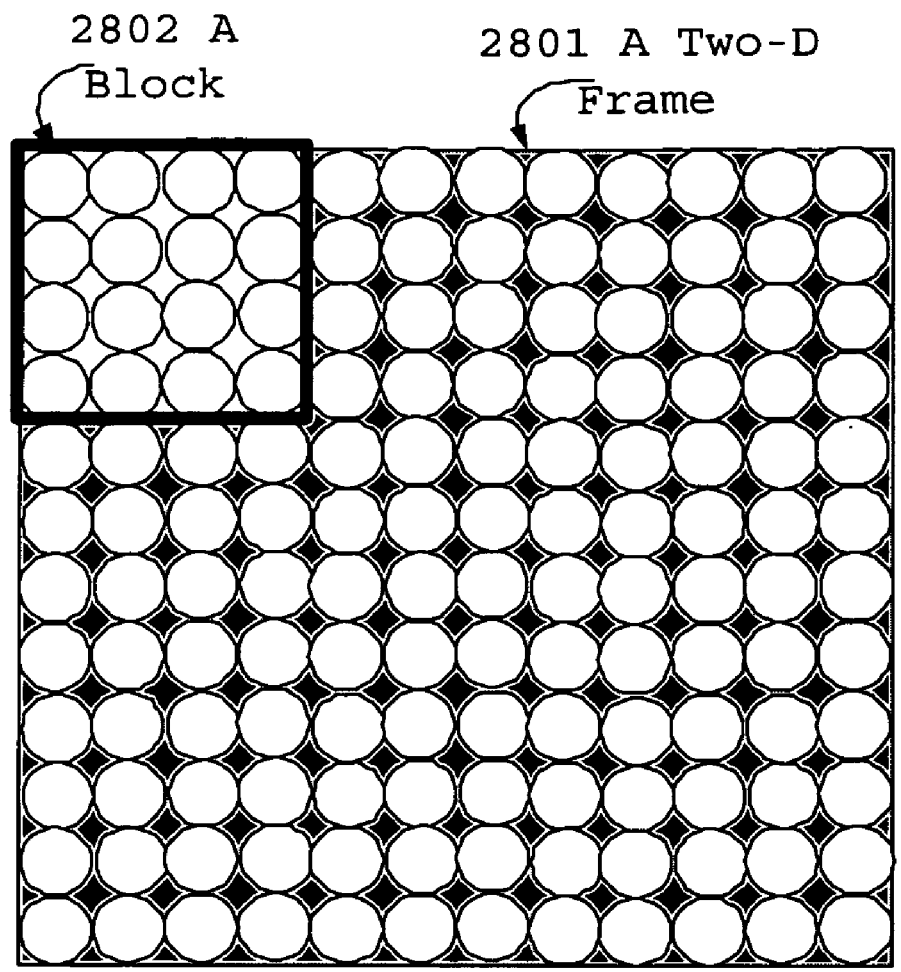
FIG. 29 is a diagram illustrating a block in a two-dimensional frame, according to one embodiment of the present invention.

FIG. 1 shows a block diagram of an exemplary embodiment of an adaptive multi-dimensional signal sequence encoding system 100. The system can be used to compress a sequence of n-dimensional signal sequence. Items 2704, 2705, and 2706 in FIG. 27 are some examples of n-dimensional sequences. The input to the system may be an n-dimensional signal frame (e.g., items 2701, 2702, 2703 in FIG. 27). A frame may be composed of n-dimensional blocks. FIG. 29 shows an example of a block 2902 in a two-dimensional frame 2901. As shown in FIG. 1, the system 100 keeps a set of decoded frames in a frame buffer 102. A target block is a block or some combination of a plurality of blocks in the reference frames. Each block in an input frame 101 may be matched against a plurality of target blocks in the reference frames inside the frame buffer according to predetermined criteria.

In order to improve tracking of the signal changes from frame to frame, the block size can be variable. In one embodiment, different block sizes and block shapes may be used to match blocks in reference frames. Larger blocks may be used to track movement of larger objects, and smaller blocks may be used to track movement of smaller objects. This block-matching operation may be implemented in an exemplary form of a motion estimation in two-dimensional video encoding cases. After the best target block is found, the difference between the current block and the target block is transformed through an n-dimensional coefficient de-correlating transform T 104, the transformed coefficients quantized through an optional quantization operation Q 105, and then encoded together with the motion vector information. The quantization operation Q may be skipped if lossless encoding is required. In a case of a lossless encoding, the encoding process is reversible, i.e., the original signal sequence can be recovered by the decoder with 100% accuracy. Since human eyes have certain precision limit, some quauntization may be allowed without influencing the human perception. The quantization is set up in such a way that the quantization error is not noticeable by human eyes.

In a typical video compression system, the transform T is a two-dimensional Discrete Cosine Transform (DCT) (ref[1]). In some cases, DCT may generate close to optimal coefficient de-correlation results. However, due to computation complexity, DCT is typically working on small fixed blocks (8×8 in MPEG4 standard, and 4×4 in H.264 standard). In order to have larger block size and save computation time, in one embodiment, Discrete Hadamard Transform (DHT) may be used as the coefficient de-correlating transform. DHT may not be as optimal as DCT in terms of de-correlating the coefficients (ref[2]). However, since DHT only requires addition and subtraction operation, much larger block size may be possible and the complexity may be reduced compared to DCT. In one exemplary embodiment, the system 100 may allow optional variable block size for the transform and optionally allow using different transforms for different block size. As an example, DCT may be used to transform small blocks, and DHT may be used to transform larger blocks. With variable block size transforms, the block size for the transform may be the same as the block matching size to generate better coefficient de-correlating effects than the small fixed block size transforms.

The quality of the encoded video may be controllable by quantization, which quantizes the transformed coefficients into discrete levels based on certain quantization parameter (QP). The larger the QP, the less number of levels, and hence less number of bits to represent the coefficients, at the cost of reduced quality. Carefully adjusting QP may balance rate-distortion trade-offs. After the quantization operation, many coefficients in the transformed block become zero. To reduce the bit rate, the quantized transform coefficients are scanned through a zig-zag scanning method, which scans the coefficients from the low frequency components to high frequency components, or in the reverse direction. This operation converts the N-dimensional coefficients into one-dimensional sequences. The scanned one-dimensional sequence is then encoded through run-length coding 106, which encodes the information in an exemplary form of number of leading zeros (run), value of non-zero coefficient(level) pairs. This (run, level) pair may then be encoded utilizing an entropy coding operation 107 (e.g., Huffman or Arithmetic coding) to further reduce the rate.

Motion Estimation (ME) Cost Function

In one exemplary embodiment, a motion estimation (ME) module 103 is a computationally intensive module in the system shown in FIG. 1. ME block matching may be based on minimizing the error measure between the current block and the target blocks in the reference frames. The error measure may be specified in terms of a difference energy measure, (e.g., a sum of square error (SSE) or a sum of absolute error (SAE) between the pixels of the two blocks, with SAE as the most widely used measure for ME search, to save computation time (ref[1]). Utilizing a difference energy measure such as SAE or SSE does not necessarily generate the minimum bit rate. In one embodiment, an entropy measure may be utilized as a cost function guiding the ME searches to find the best target block. The entropy measure measures the amount of information needed to encode the current block, given the reference frames. In one exemplary embodiment, a method to guide the ME search to find the minimum entropy for the target block may be utilized. The ME cost function, in one embodiment, may be specified as:

$$J = \text{Rate\_}T(T(FPD)|QP) + \text{Rate\_}MV(MV) \quad (1)$$

where Rate_*( ) is the number of bits for the signal through each of its own encoding method such as Rate_T, Rate_MV, etc.; T(FPD) is the transform of the frame prediction difference FPD; QP is the quantization parameter.

The cost function J may be evaluated by determining an approximation of Rate_T(T(FPD)|QP) during the ME search process, since Rate_MV( ) can be easily determined. In one embodiment, Rate_T( ) may be specified as:

$$\text{Rate\_}T(T(FPD)|QP) = \text{Rate\_}T\_DC(T\_DC\{FPD\}|QP\_dc) + \quad (2)$$
$$\text{Rate\_}T\_AC(T\_AC(FPD)|QP\_ac)$$
$$\sim = \text{Rate\_}T\_DC(DC\{FPD\}|QP\_dc) +$$
$$\text{Rate\_}T\_AC(AC\_NORM(FPD)|QP\_ac)$$

where T_DC(FPD) is the DC component of T{FPD}; T_AC (FPD) is the AC matrix of T(FPD); DC(FPD) is the DC value of the FPD block; AC_Norm(FPD) is the Norm value of the AC matrix for the FPD block:

$$AC\_NORM(FPD) = \Sigma_{ij} ABS(FPD_{ij} - DC(FPD)) \quad (3)$$

A simple approximation for the entropy measure may be expressed as:

$$J = R\_DC(DC(FPD)|QP\_dc) + R\_AC(AC\_NORM \\ (FPD)|QP\_ac) + R\_MV(MV) \quad (4)$$

where R_DC( ) and R_MV( ) can be evaluated accurately through simple table lookups; R_AC( ) can be approximated through a pre-fitted table.

The relationship between R_AC and AC_NORM may depend on the coding methods used, and, in one embodiment, may be fitted by linear or piece-wise linear models, as shown in FIG. 2. In one embodiment, utilizing MPEG4 standard, the following approximation for R_AC( ) may be utilized:

$$R\_AC(AC\_NORM|QP\_ac) = AC\_NORM/(2*QP\_ac) \quad (5)$$

In another embodiment, the following linear model may be utilized:

$$R\_AC(AC\_NORM(FPD)|QP\_ac) = K*AC\_NORM/ \\ QP\_ac \quad (6)$$

In general, K may vary based on local statistics of the FPD. To find the local statistical relationship between R_AC and AC_NORM, an adaptive method may be utilized to dynamically adjust the K factor specified above.

Figure 3:
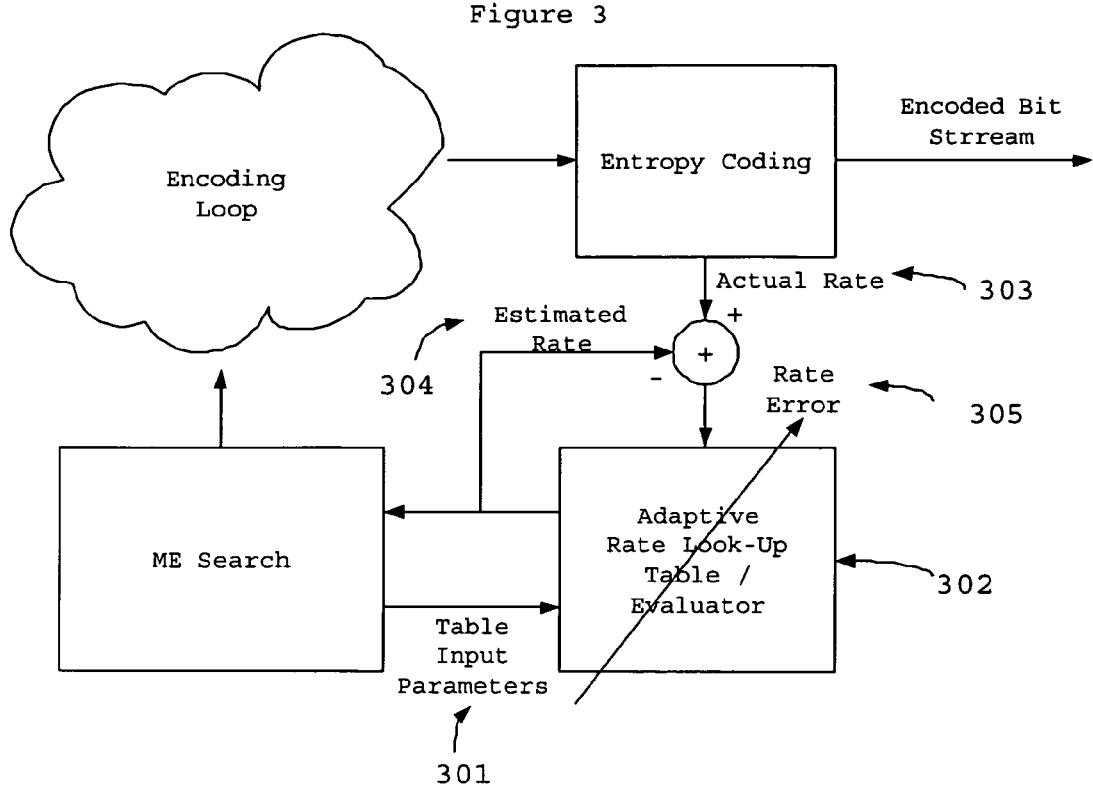
FIG. 3 is a diagram illustrating structure of adaptive rate lookup table/evaluator, according to one embodiment of the present invention.

FIG. 3 shows an embodiment of the adaptive rate lookup table/evaluator structure. During the ME search process, the entropy (e.g., expressed as a bit rate) may be estimated through entering a set of table input parameters 301 into a rate lookup table/evaluator 302. For each block, the actual encoded rate 303 from the entropy coding 107 may be compared with the estimated rate 304, and the error 305 may be fed back to the adaptive rate lookup table to adjust certain table parameters to reduce the rate error. In general, the rate lookup table includes an accurate rate portion and an estimated rate portion, as specified below:

$$J \sim = R\_\text{Accurate} + R\_\text{Estimation} \quad (7)$$

R_Accurate is the portion of the rate which can be accurately determined given certain input parameters. In one specific embodiment, R_Accurate includes R_DC and R_MV, i.e., $$R\_\text{Accurate} = R\_DC(DC/QP\_dc) + R\_MV(MV) \quad (8)$$

R_Estimation is the estimated portion of the block and in general is dependent on a set of input parameters to the lookup table. In one embodiment, R_Estimation is estimated as a linear combination of certain input parameters, i.e., $$R\_\text{Estimation} = \Sigma_i K_i * (X_i - \Theta_i) \quad (9)$$

where $\{X_i\}$ are the input parameters, $\{\Theta_i\}$ are the threshold of input parameters, and $\{K_i\}$ are the weight factors. Here we applied least mean square (LMS) algorithm (ref[3]) to train the weight factors $\{K_i\}$ through, and keep the threshold values $\{\Theta_i\}$ pre-fixed or dynamically adjustable. In one specific embodiment of the method specified above, we can accurately look up the R_DC( ), R_MV_X( ), and R_MV_Y( )

(and R_MV_F( ) for multiple frame reference cases, as used in H.264), and adaptively adjust the K factor for R_AC( ) using linear model. In this case, the cost function may be expressed as follows:

$$J = R\_DC(DC|QP\_dc) + R\_MV(MV) + K*(AC\_NORM - AC\_THRESHOLD)/QP\_ac \quad (10)$$

Let R be the rate of the block after entropy coding (including the rate for DCT and MV), and let J be the estimation of the rate of the block, then K can be adjusted through the following procedure:

$$\Delta K = \mu*(R-J)*(AC\_NORM - AC\_THRESHOLD)/QP\_ac \quad (11)$$

where $\Delta K$ is the adjustment of K factor; (R−J) is the rate error; $\mu$ is the learning factor, usually set in such a way to balance the convergence speed and stability; AC_THRESHOLD is the threshold value characterizing the minimum AC_NORM value where AC Rate remains non-zero. AC THRESHOLD can be pre-fixed to certain value or dynamically adjustable. In one embodiment, AC_THRESHOLD may be adjusted according to the following exemplary process (specified in C like pseudo code):

```
Zero_Point = Th0;
for each block { // block processing loop
    ............
    If {Actual AC Rate == 0} {
        Zero_Point = α * AC_NORM + (1 −α) * Zero_Point;
        AC_THRESHOLD = m * Zero_Point;
    }
}
``` where Zero_Point is a variable tracking the zero rate AC_NORM locations; Zero_Point is initialized to the value Th0 at the beginning of the process; α is averaging window control factor, which is a small positive number larger than zero; m is a scaling factor to control the location of the AC_THRESHOLD based on the average Zero_Point value.

In one embodiment, the method to adjust K in (11) may minimize the mean square error of the rate function:

$$\min E\{(R-J)^2\} \quad (12)$$

In general, multiple parameters may be used to determine R_Estimation, as specified in (9), in which case the following adaptation method for K factors may be used:

$$\Delta K_i = \mu*(R-J)*(X_i - \Theta_i), \text{ for each } i \quad (13)$$

In one embodiment, the entropy based cost function (4) may create lower bit rate and better image quality as compared to difference energy measure based cost functions.

ME Searching Method

In order to identify the optimal point yielding the lowest cost function value, the searching of a large region may be required. The computation cost may be prohibitively high in order to support real time applications. In one exemplary embodiment, a method may be utilized to perform large region ME search to create close to full search results with less than 1% of computation time comparing with full search. This method is based on the observation that inside most frames in real world n-dimensional frame sequences (as in typical video samples), there is only a small number of motion vector clusters and the motion vector field is continuous varying from blocks to blocks inside each cluster. Based on this observation, the motion vectors from the neighboring blocks may provide a good suggestion about the starting point for ME search.

Figure 4:
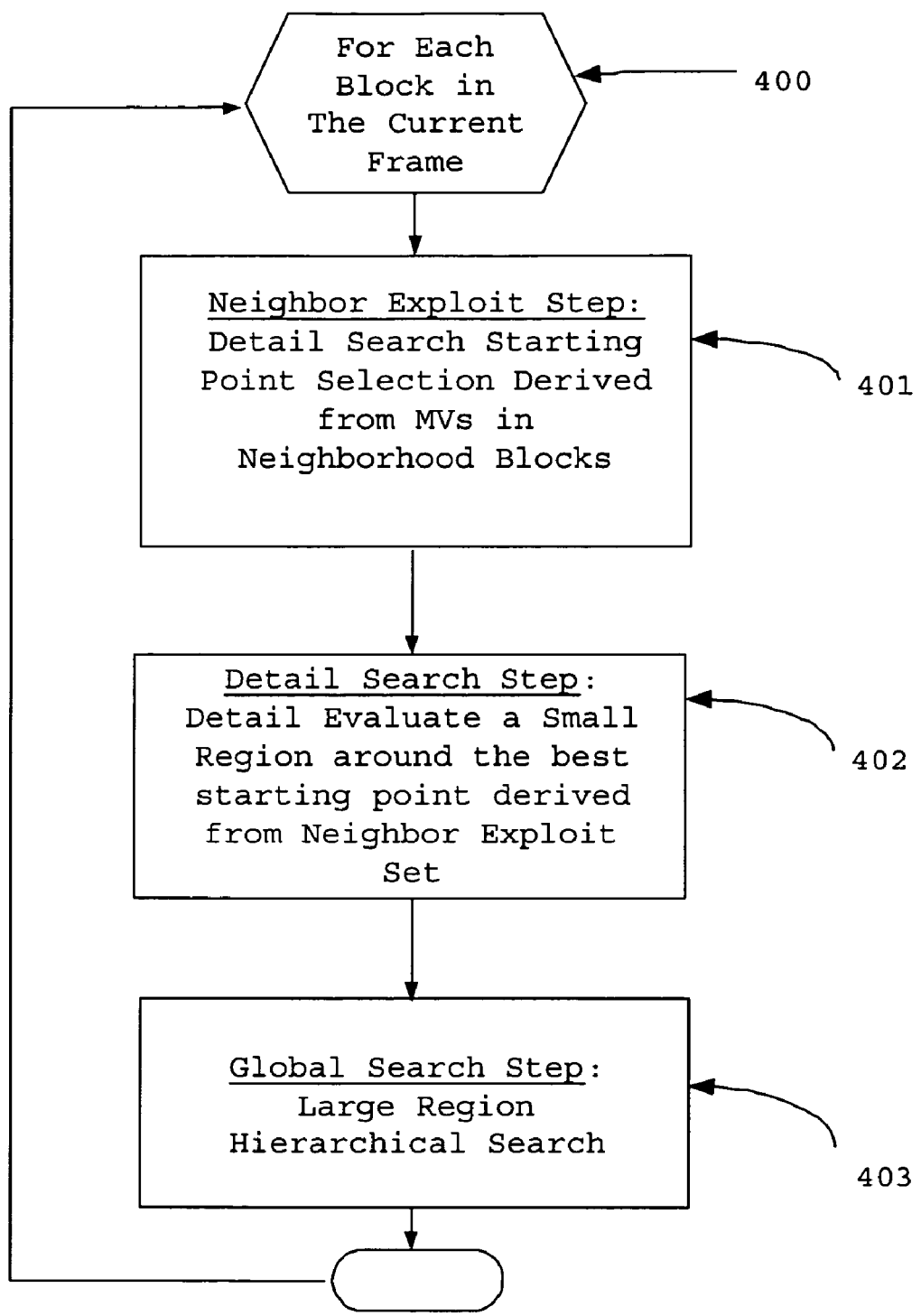
FIG. 4 is a diagram illustrating a fast ME search procedure, according to one embodiment of the present invention.
Figure 5:
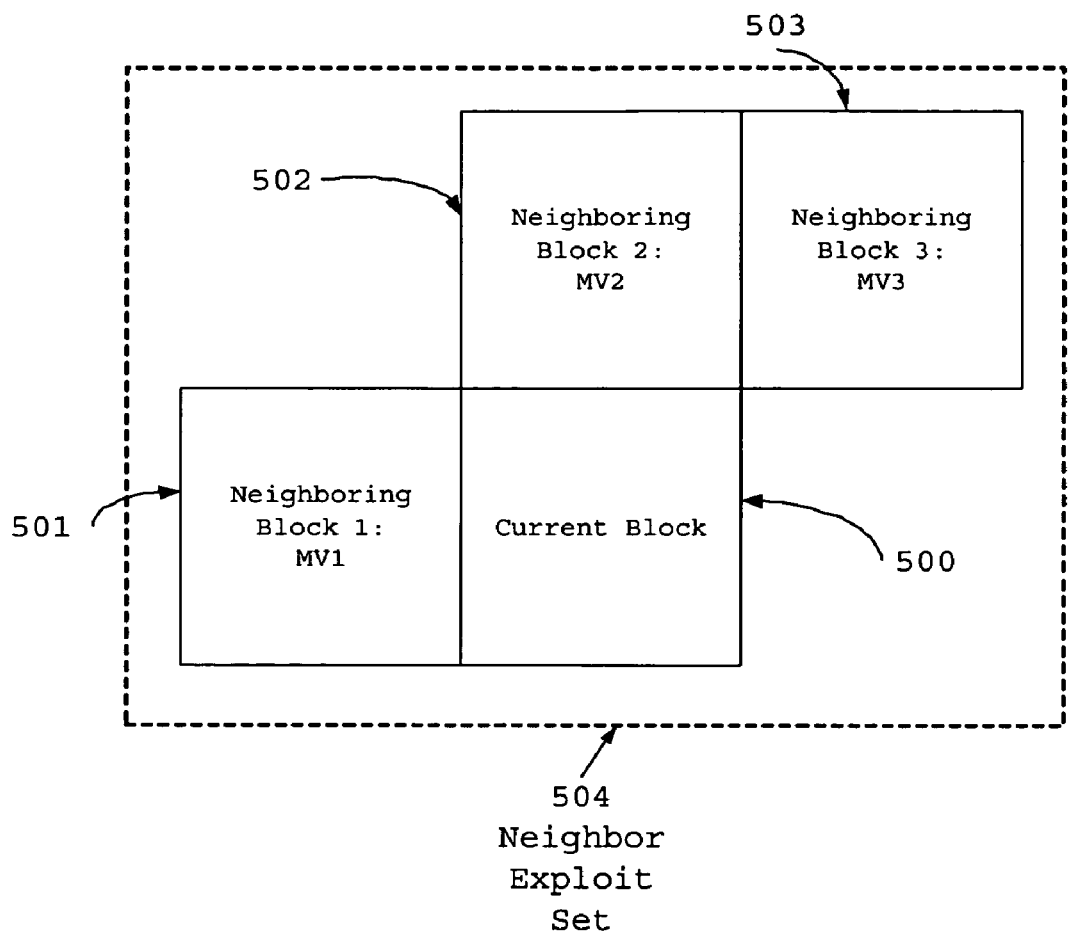
FIG. 5 is a diagram illustrating one example of neighbor exploit set in two-dimensional video sequence case, according to one embodiment of the present invention.
Figure 6:
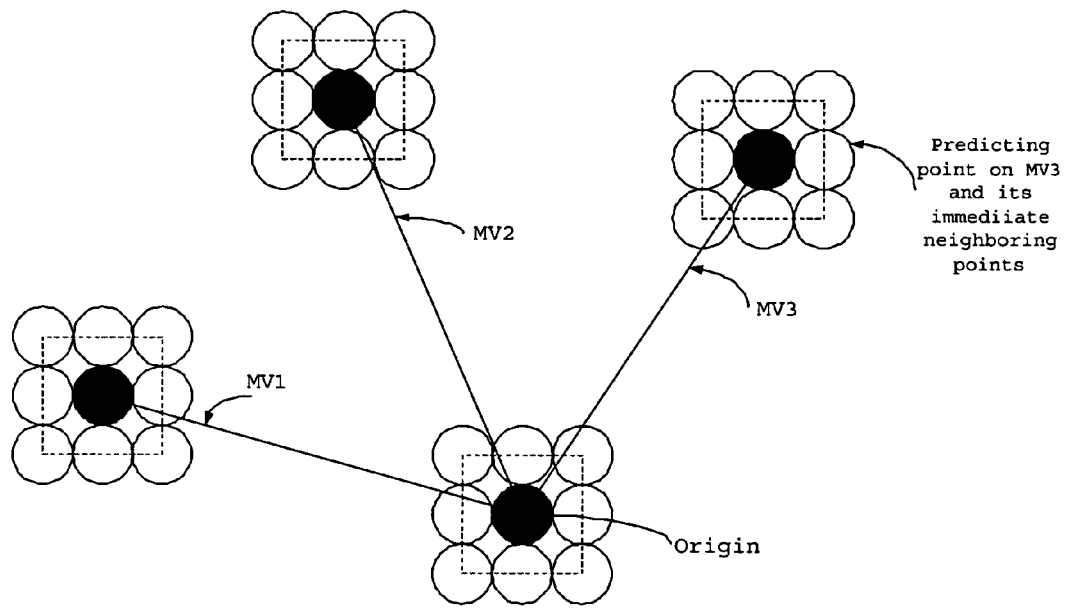
FIG. 6 is a diagram illustrating points evaluated to determine the detail search starting point, according to one embodiment of the present invention.

FIG. 4 shows one embodiment of a fast ME search procedure. At operation 401, a set of points is evaluated based on the reference displacement indexes (e.g., motion vectors (MVs)) of the neighboring blocks, (and possibly the immediate neighboring points surrounding those points referred to by the MVs, as shown in FIG. 6), to determine the starting point of the detail search (operation 402 in FIG. 4). The neighboring blocks may be neighbors in space domain and/or in time domain, and may be referred to as a neighbor exploit set. FIG. 5 shows one example of applying this method to a two-dimensional video sequence case, where the MVs from the three neighboring blocks: Left 501, Up 502, Up-Right 503, and Origin, are used to determine the ME search starting point for the current block 500. The four blocks together compose the neighbor exploit set 504 for the current block. The point yielding the lowest cost value is selected as a starting point for the detail ME search.

After the neighborhood exploit operation 401, the detail search operation 402 is performed. The detail search may be utilized to perform a thorough evaluation of the points surrounding the detail search starting point, which may be selected based on evaluating the points in the neighbor exploit set.

Figure 7:
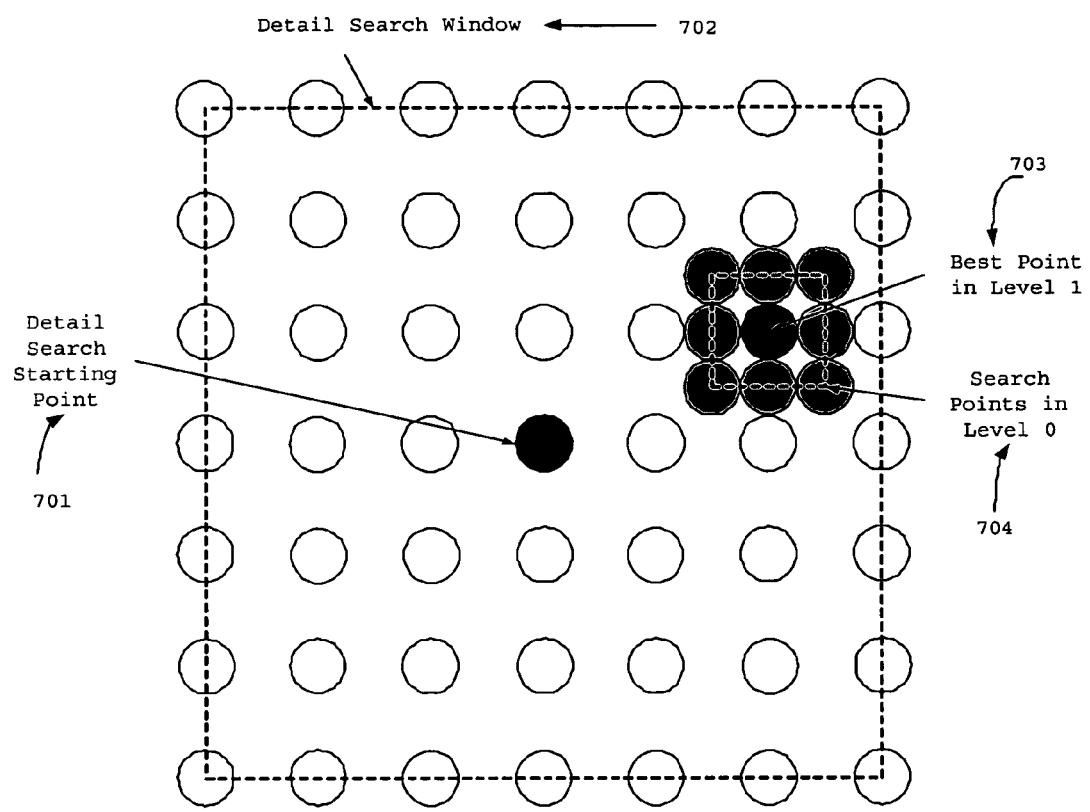
FIG. 7 is a diagram illustrating an embodiment of detail search, according to one embodiment of the present invention.

FIG. 7 shows a specific embodiment of this operation. Here, a two level search is performed within a small region 702 surrounding a search starting point 701. In level 1, ME search is performed for every other point. After the best point 703 at level 1 is determined, its immediate neighboring points 704 in level 0 are evaluated to determine the best point. Let the best cost-function value found so far be J_Best.

Figure 8:
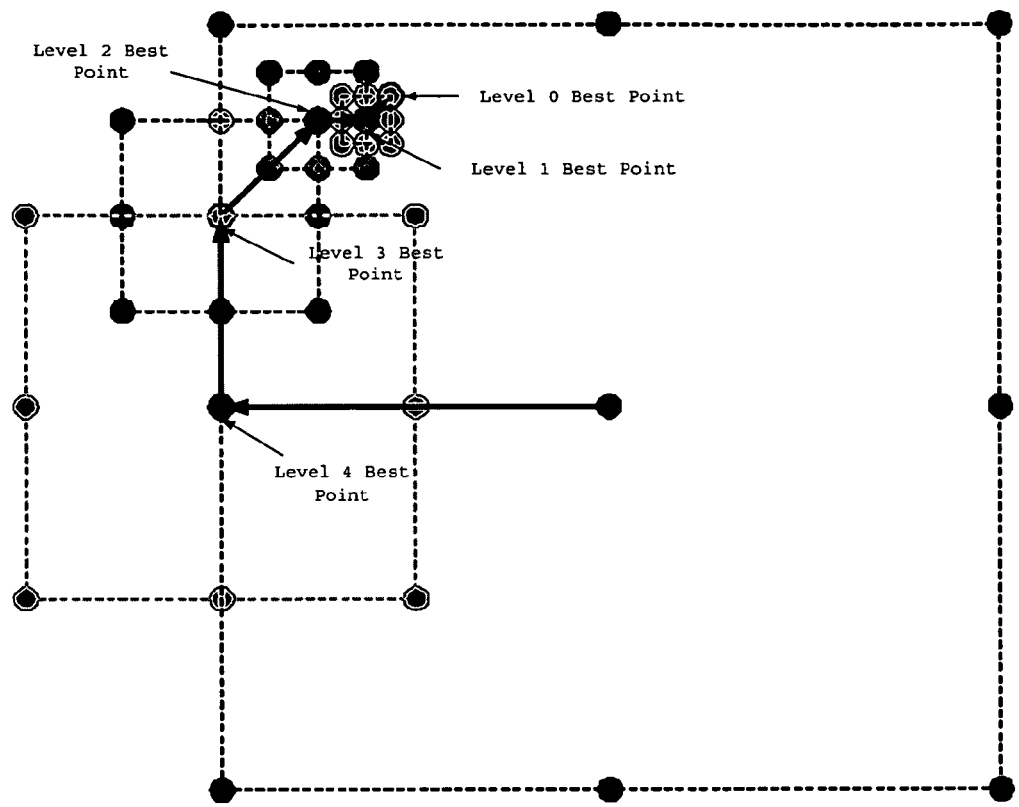
FIG. 8 is a diagram illustrating an embodiment of global search, according to one embodiment of the present invention.

After the detail search, the large region hierarchical search is performed at operation 403 of FIG. 4. Operation 403 may be termed the global search operation. The purpose of this operation is to sample the points in a large search window to find motion vectors outside the detail search region in case the neighboring blocks do not provide accurate initial starting point. FIG. 8 shows an embodiment of this operation. Here an n-level hierarchical search is performed. At each level, eight points surrounding the best point from the upper level are evaluated. For search window=+−128 case, the following may be shown:

Level 6: (64, 0), (−64, 0), (0, 64), (0, −64), (64, 64), (64, −64), (−64, 64), (−64, 64)

Level 5: ({+−32, 0}, {0, +−32}, {+−32, +−32}) from the best point in Level 6

Level 4: ({+−16, 0}, {0, +−16}, {+−16, +−16}) from the best point in Level 5

Level 3: ({+−8, 0}, {0, +−8}, {+−8, +−8}) from the best point in Level 4

Level 2: ({+−4, 0}, {0, +−4}, {+−4, +−4}) from the best point in Level 3

Level 1: ({+−2, 0}, {0, +−2}, {+−2, +−2}) from the best point in Level 2

Level 0: ({+−1, 0}, {0, +−1}, {+−1, +−1}) from the best point in Level 1

In order to save computation time, it may not be necessary to search all the way down to level 0. Stopping at level 3 (operation size 8) may generates acceptable results. This process may continue until the final level is reached. The point with the lowest cost value during the n-level hierarchical search may then be compared with the best point from the detail search, and the point yielding the lower cost value is selected as the best ME search matching point.

The ME search operations shown in FIG. 4 is distinct from the commonly used fast searching method. The unique combination and order of operations 401, 402, 403 of FIG. 4 may yield close to full search results. Here, operation 401 may be utilized to identify the MV found from the neighboring blocks to set the detail search starting point. Operation 402 may be utilized to thoroughly evaluate the points surrounding the best starting point found in 401. This operation may also set a cost function value threshold for the next operation. Operation 403 goes out of the small detail search region to cover the whole search space trying to reach the neighborhood of good points if the detail search cannot find a point yielding low enough cost value. The search results from the previously evaluated blocks may be transferred to the blocks in their neighborhoods. This relay effect may propagate good results and may enable a local group cooperation between blocks to achieve global optimization, like the system dynamics observed in cellular automata (ref [4]) or neural network (ref[5]) systems.

Fractional Grid Point Search Method

Figure 9:
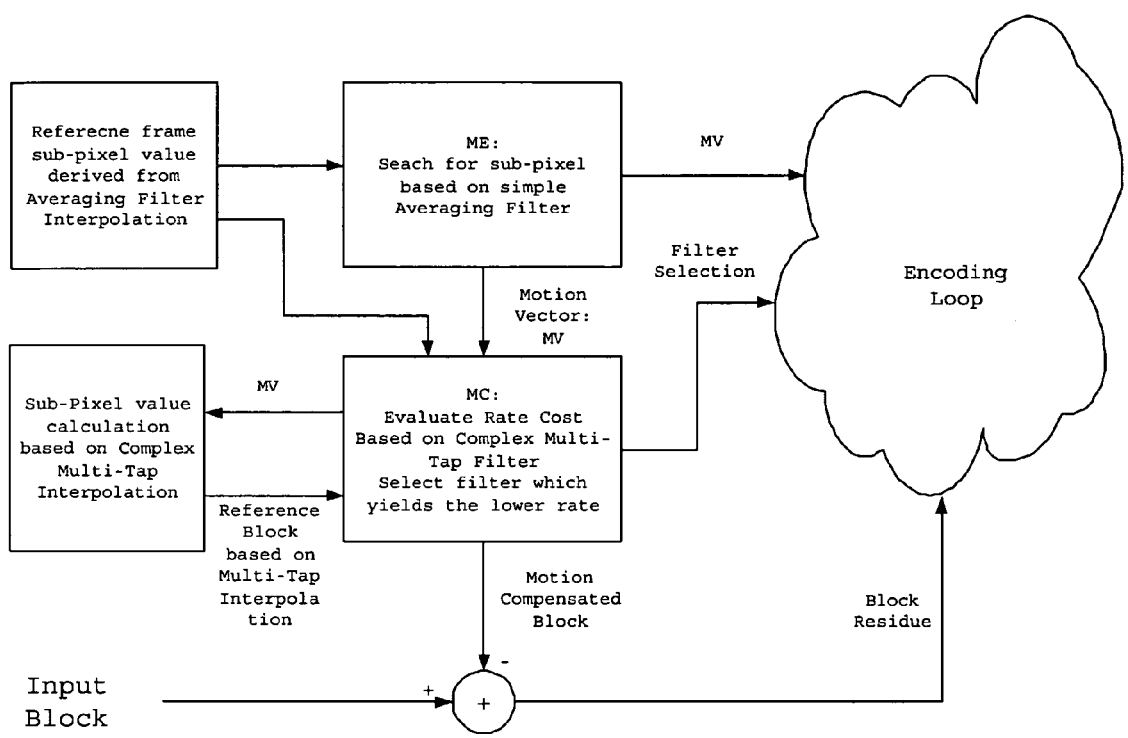
FIG. 9 is a diagram illustrating one embodiment of encoding with block matching at fractional grid points, according to one embodiment of the present invention.
Figure 10:
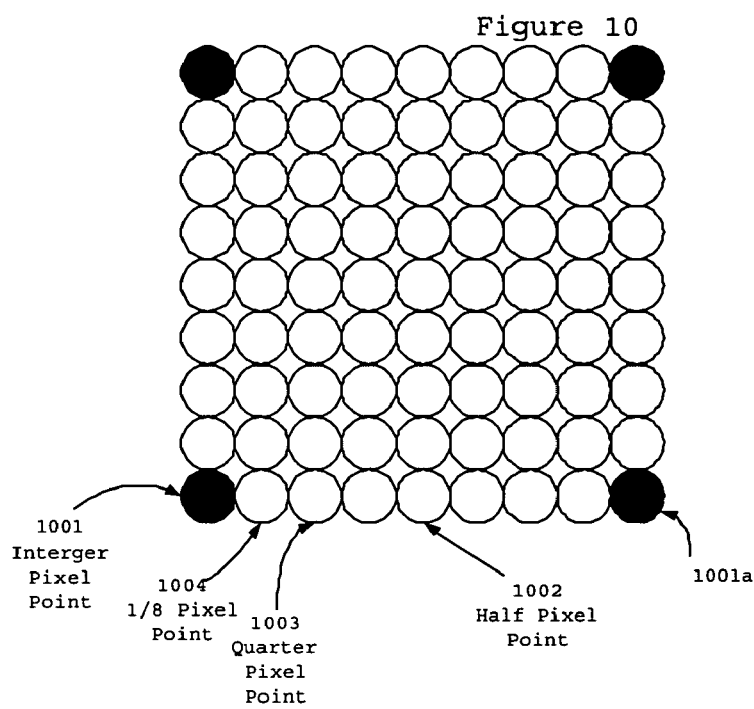
FIG. 10 is a diagram illustrating using averaging filter to calculate sub-pixel values during ME search, according to one embodiment of the present invention.

To further reduce the rate, in one embodiment, a fractional grid point search may be performed after the best integer grid point is found through performing the ME search procedure described above. In MPEG4 and H.264 standards, multiple-tap interpolation functions are used to create h-pel pixels in q-pel mode. This may be computation intensive if performed in ME search inner loop. To address this issue, a method to perform ME search on the fractional points using simplified interpolation may be utilized. In a video encoding application, in one exemplary embodiment, a simple filter may be utilized to generate sub-pixel values for ME search. After the best sub-pel point is found, a more complex multi-tap filter may be utilized for motion compensation calculation. The result may be close to the ME search using true multiple-tap filters. The results may be enhanced through adaptive motion compensation filter selection. FIG. 9 shows one exemplary embodiment of this concept. ME search may be performed using a simple averaging filter, and then select a filter generating the lower rate in the motion compensation (MC) process. FIG. 10 shows how to use an averaging filter to calculate the sub-pixel values during ME search. The pixel values are only available at the integer pixels (1001, 1001a, etc.), and the sub-pixel location can be interpolated. In one embodiment, bi-linear interpolation is utilized to calculate the sub-pixel values for ME search reference frame. An example in FIG. 10 illustrates the following:

Half-Pixel:

Pixel Value at 1002=(Pixel Value at 1001+Pixel Value at 1001a)/2

Quarter-Pixel:

Pixel Value at 1003=(Pixel Value at 1001+Pixel Value at 1002)/2

⅛-Pixel:

Pixel Value at 1004=(Pixel Value at 1001+Pixel Value at 1003)/2

This method, in one embodiment, may be extended to $1/(2^n)$ pixel evaluation and further extended to process N-Dimensional signal sequences.

Adaptive Encoder Control

Figure 11:
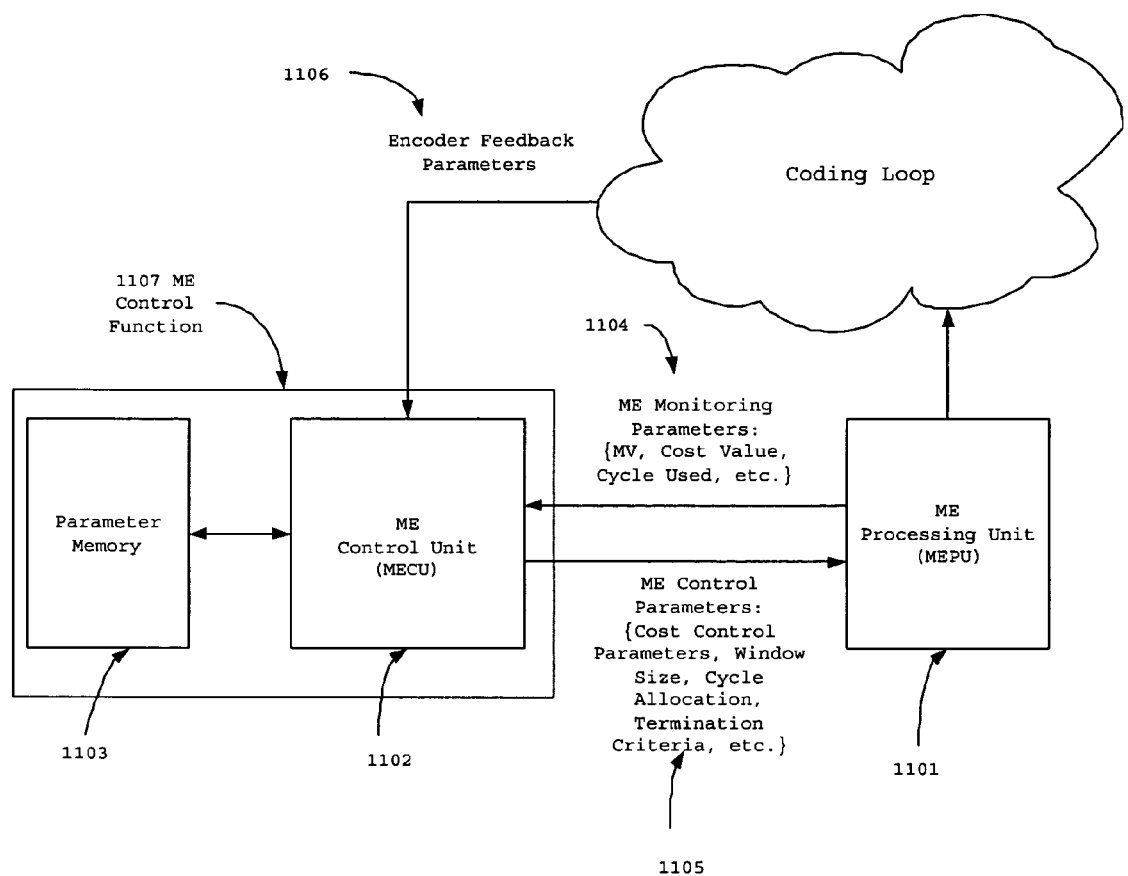
FIG. 11 is a diagram illustrating an adaptive ME control structure, according to one embodiment of the present invention.

The characteristics of the blocks of the input frames vary inside a frame and from frame to frame. A structure may be utilized to improve the quality and performance of the encoder based on feedbacks from the encoder outputs, and optionally from some block characteristic values monitored throughout the encoding process. As an example, the MV range distribution across blocks and frames may be uneven. Since a larger MV means that more ME search cycles are required, an uneven ME search cycle may be required across blocks and frames. In one embodiment, a method is utilized to allow cycle sharing among frames and blocks for better utilization of hardware processing cycles. FIG. 11 shows an adaptive ME control structure. ME processing Unit (MEPU) 1101 is an engine to perform the ME search. ME Control Unit (MECU) 1102 is the unit used to control MEPU. MECU takes as inputs some ME monitoring parameters 1104, encoder feedback parameters 1106, and some adjustable parameters stored in parameter memory 1103, to create a set of ME control parameters 1105, for adaptively controlling MEPU for better utilization of MEPU cycles to achieve the optimal ME search objectives. The adaptive rate lookup table shown in FIG. 3 and the learning method specified before can be considered as a specific embodiment of the ME control function 1107 in FIG. 11.

In another exemplary embodiment of the ME control function, the ME search range may be adjusted for the current frame based on the MV values from the past frames. The past X, Y (and frame for H.264 case) motion vector values may be monitored and the ME search range in each dimension (X, Y, or F) on the current frame may be enlarged or reduced. This adaptive ME search window adjustment method, may effectively reduce the bit rate needed to represent the motion vectors and may reduce the number of cycles for ME search.

Figure 12:
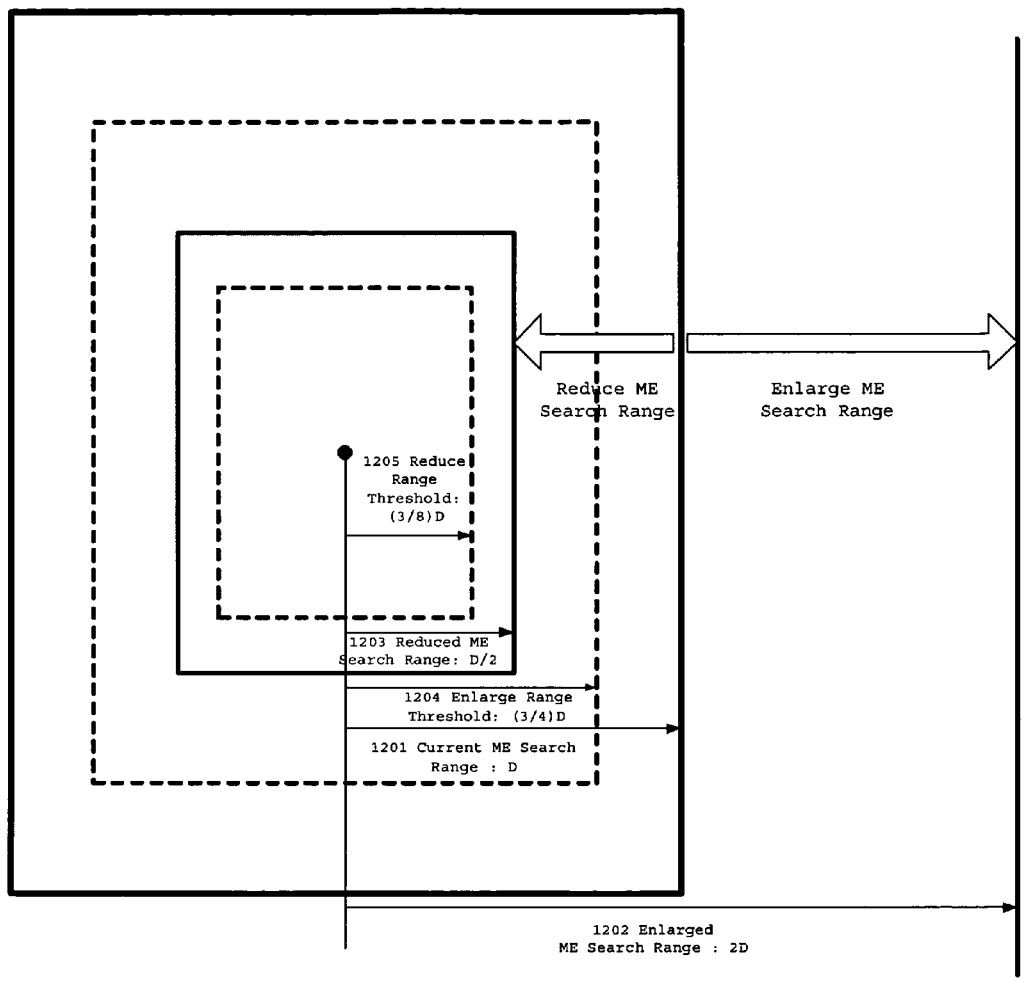
FIG. 12 is a diagram illustrating an example of adjustable ME search range, according to one embodiment of the present invention.

FIG. 12 illustrates one example of the ME search range adjustment method. For a given current ME search range D 1201, the ME search range can be adjusted according to the following criteria:

1. If the number of MVs with range larger than the enlarge range threshold 1204 (set to 3D/4 in this example) is larger than some pre-set threshold number, then enlarge the ME search range to 2D.
2. If the number of MVs with range larger than the reduce range threshold 1205 (set to 3D/8 in this example) is smaller than some pre-set threshold number, then reduce the ME search range to D/2.

The method shown in FIG. 12 may be utilized to adjust the ME search range in each independent ME search dimension (X, Y, and possibly F for H.264 multi-frame cases).

In addition to the adaptive ME search range method specified above, the system 100 may also early terminate the ME search for each block when a certain condition is met, in order to save processing cycles. The processing cycles saved from the early termination may be added to the available cycle pool. MECU will base on the cycles available in the pool to allocate and schedule the cycles for the MEPU to use. This approach may allow to fully utilize the available processing cycles to achieve the best ME search results.

Figure 13:
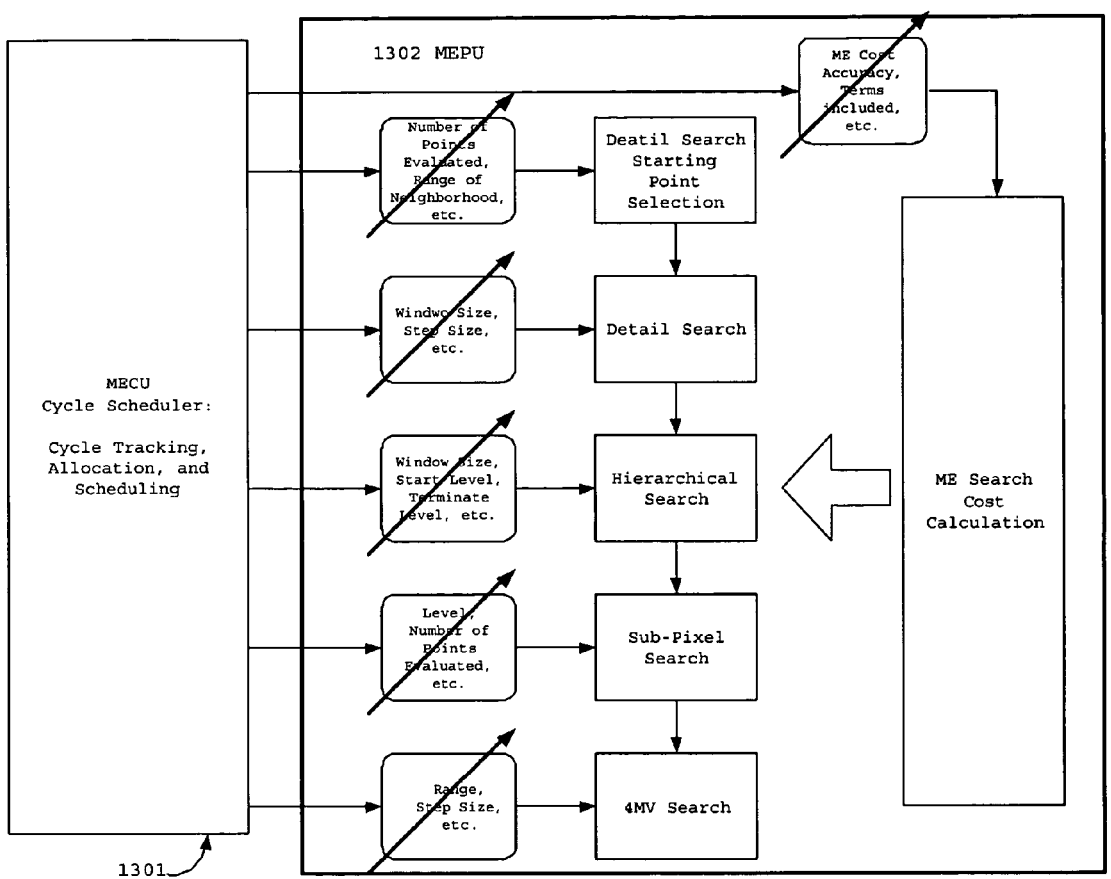
FIG. 13 is a diagram illustrating an embodiment of MEPU cycle scheduler, according to one embodiment of the present invention.

FIG. 13 shows an embodiment of the MEPU cycle scheduler 1301. The MECU cycle scheduler adjusts the ME search control parameters for the modules in MEPU 1302 based on the cycles available in the cycle pool.

Three exemplary early termination scenarios are the following:

1. Skip situation: Check the current block against the block at the same location in the reference frame. If both blocks are similar, then the ME processing can be skipped. In this situation, we skip the major part of the video-encoding loop (including ME, DCT, etc.) and save a lot of cycles. One embodiment of the similarity criteria for Skip is:

a. Calculate block difference [BD] between the current block and the block at the same location in the reference frame.
b. Calculate DC[BD] and AC[BD]
c. If DC[BD]/QP_dc<SKIP_DC_TH AND AC[BD]/QP_ac<SKIP_AC_TH, then SKIP. SKIP_DC_TH and SKIP_AC_TH are some thresholds to determine the SKIP condition. SKIP DC_TH and SKIP_AC_TH can be fixed or dynamically adjustable according to certain feedbacks from the encoder. As an example, in one embodiment, SKIP_AC_TH is set to the dynamically adjusted AC_THRESHOLD value specified above.

2. Good match termination: At any moment during the ME search for a certain block, when the cost function value is lower than certain threshold J_Early_Terminate_TH, we can terminate the ME search. This happens when a very good block match is found, which results in low cost function value. J_Early_Terminate_TH can be a pre-fixed value or dynamically adjustable based on the certain characteristic value of the encoder. For example, in one embodiment of this invention, $$J\_Early\_Terminate\_TH = f * J\_Best\_Mean$$

where f is positive number less than 1, which is used to control the J_Early_Terminate_TH; J_Best_Mean is the moving average value of J_Best through a certain moving sampling window. In one embodiment of this invention, J_Best_Mean can be calculated simply by the following formula:

$$J\_Best\_Mean = \alpha * J\_Best + (1-\alpha) * J\_Best\_Mean$$

Where $\alpha$ is a small number less than 1 used to control the width of the moving averaging window.

3. ME search give up termination: This happens if further ME search is not likely to produce better results than the best cost value J_Best found so far. When this happens, we don't need to waste cycles to search more points for that particular block. This can be evaluated by some lower bound estimation for future search points. If the lower bound for future search points is larger than the best cost found so far, we can terminate the search without sacrificing anything. This idea can be considered as applying A* search algorithm (ref[6]), which is used frequently in game tree search, to ME searching. The following embodiments are some examples derived from this idea
a. After finishing the 1MV search and prior to 4MV search, we terminate the 4MV search if best cost value found from 1MV is smaller than the motion vector rate, i.e., $$J\_Best(1MV) <= R\_MV(4MV)$$

Figure 14:
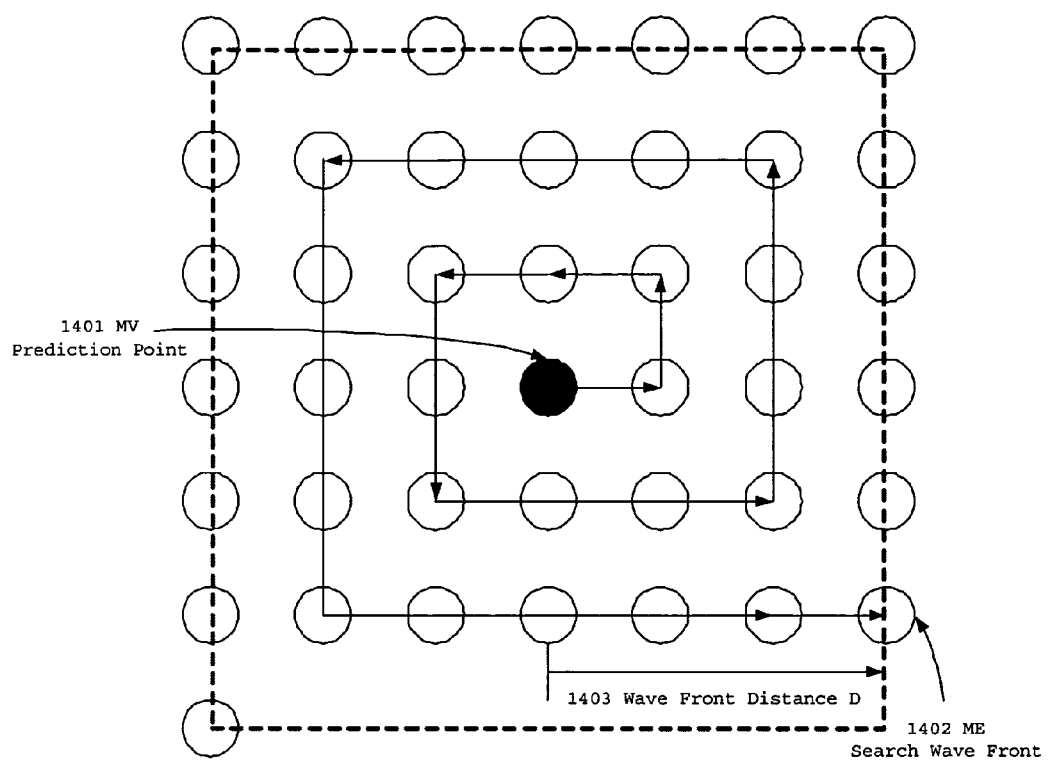
FIG. 14 is a diagram illustrating early-termination in the case of spiral search, according to one embodiment of the present invention.

This is because $$R\_MV(4MV) < J(4MV) = R\_DC(4MV) + R\_AC(4MV) + R\_MV(4MV)$$

b. In MPEG4, if we perform ME search following some spiral pattern from the ME prediction point, then R_MV(MV) would be sorted from the search starting point in increasing order of the rate for the motion vectors. Under this condition, we can terminate the ME search process if the rate for the motion vector is larger than the best cost found so far. This idea is illustrated in FIG. 14. The ME search starts from some prediction point 1401. As shown in FIG. 14, the ME search follow some spiral wave expansion pattern. In MPEG4, the MV is coded as the difference from the prediction point: R_MV=R_MV_X(Delta_X)+R_MV_Y(Delta_Y). R_MV_X( ) and R_MV_Y( ) follow the same VLC table R_MV(Delta) and both are monotonically increasing with Delta. In FIG. 14, if the R_MV(D)>=J_Best (the best cost value found so far), when ME search wave expansion reaches the Wave Front 1402, we can terminate the search, since all the future R_MV( ) will be larger than R_MV(D).

In another embodiment, A* search method may be utilized to prune the number of points to be evaluated in the search process. In general, if the cost function J(p) at any given point p is larger than certain bound B(p), and if B(p)>J_Best, the best cost function value found so far, then the point p can be skipped without sacrificing any quality. Notice that B(p) can be some variable increasing through the evaluating process of point P, while more information is processed related to point p. At any given moment, if B(p)>J_Best is satisfied, the calculation for point p can be stopped.

Neighbor Preserving Scanning Method

Figure 28:
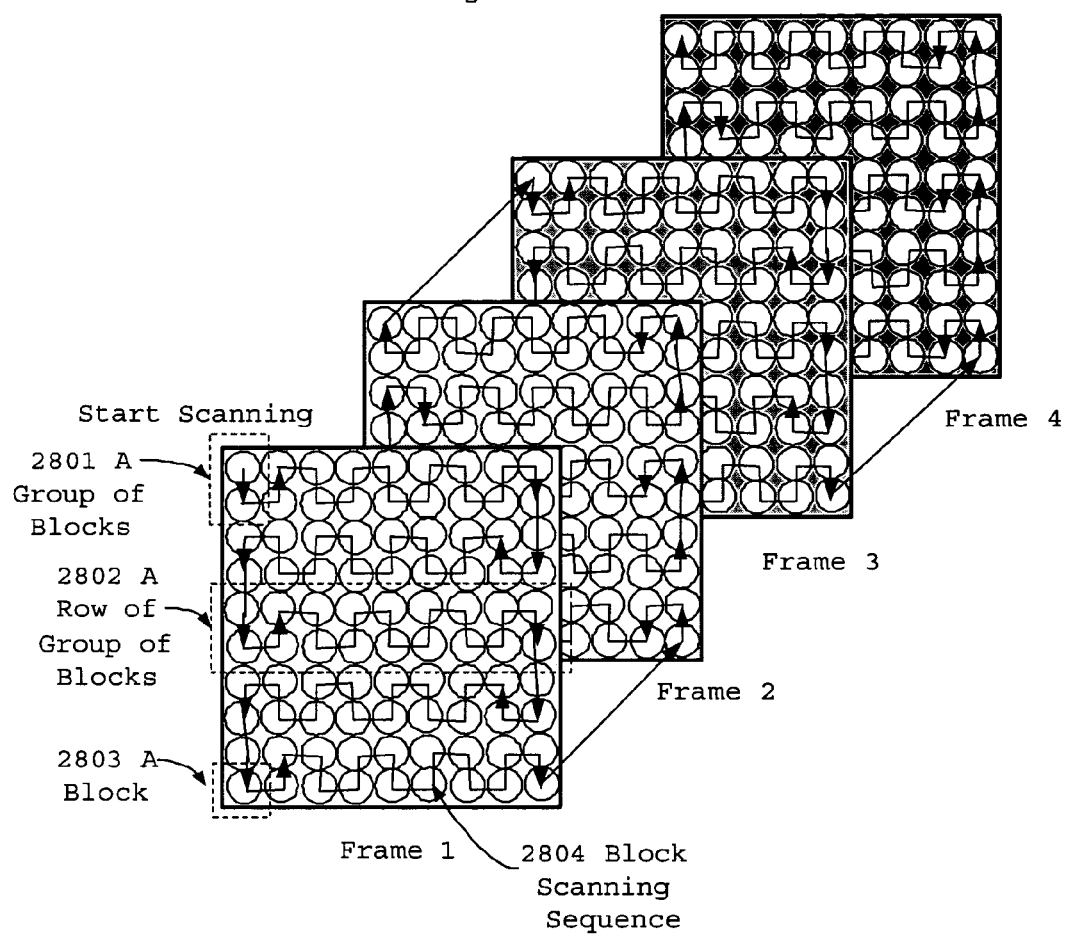
FIG. 28 is a diagram illustrating a scanning method for neighbor preserving, according to one embodiment of the present invention.

In order to achieve best adaptive learning from the past block processing results, the learned information may be more useful if the blocks are scanned and processed according to certain sequence to preserve the spatial and temporal distance order relationship. FIG. 28 shows one example of embodying a neighbor preserving scanning method in two-dimensional video sequence processing. Here the blocks 2803 are scanned and processed according to the order as shown 2804. This method may be specified as the followings:
(a) Scan a row of group of n blocks, n positive integer start the next row of group of the blocks from the location where the previous row end.
(b) After finishing scanning one frame, start the next frame scanning from the location where the previous frame ends and scan the rows in the reverse order as the previous frame. Repeat (a) and (b) for each frame.

The shown scanning process can preserve the neighbor relationship in the scanned sequence, i.e., the neighboring blocks in the one-dimensional sequence after scan are also spatial or temporal neighbors in the original n-dimensional sequence. In general, the neighborhood preserving scan maximizes the matching of the following conditions:
(a) The neighboring blocks in the one-dimensional sequence after scan are also neighbors in the original N-dimensional sequence.
(b) Two blocks are considered neighbors, if they are adjacent blocks in the same frame (spatial neighbor), or reside at the same location in adjacent frames (temporal neighbor). The exemplary scanning method may be used hierarchically.

Figure 30:
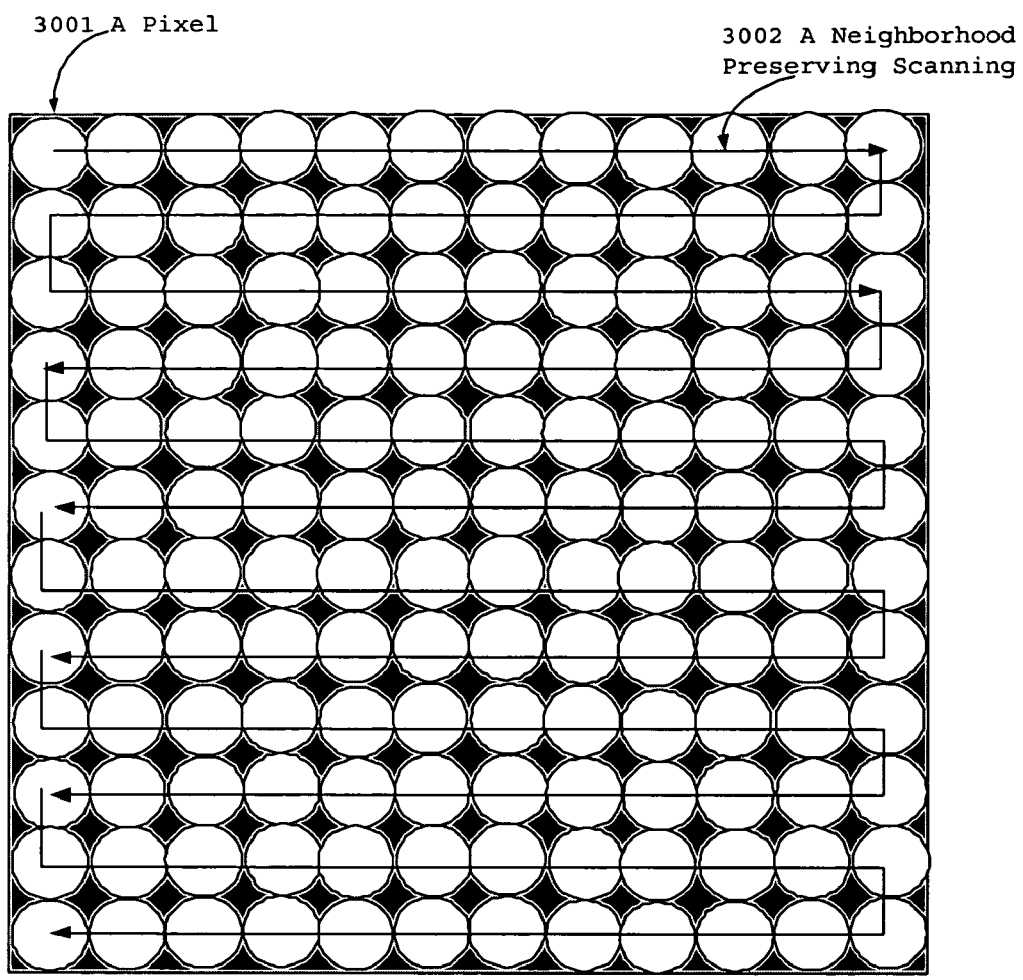
FIG. 30 is a diagram illustrating neighbor preserving scan applied to CCD or CMOS image sensor, according to one embodiment of the present invention.

In one embodiment, each n-dimensional block-may also be scanned by the same method within itself. In general, a multi-level of hierarchy for this scanning method may be allowed. An exemplary neighbor preserving scan method may also be applied to the peripheral image scanning devices, such as charge couple device (CCD) sensors and CMOS sensors to prepare the input signals to match the signal processing order. This way, it may be possible to remove a frame buffer from the input sensing devices. FIG. 30 shows an embodiment of our scanning method to CMOS or CCD image scanning. Here the light signals sensed at each pixel 3001 are scanned out in the neighborhood preserving order 3002.

N-Dimensional Memory Storage

The implementation of the ME algorithm typically has a bottleneck at accessing the reference buffer memory. With the video streams typically organized in 2-dimensional or 3-dimensional objects in video algorithms, the use of one-dimensional linear addressing based memory does not provide efficient result. To address this problem, a special memory structure, an n-dimensional memory storage based on traditional one-dimensional addressing based memory is developed to optimize the memory access efficiency and access pattern flexibility for ME algorithm frame buffer accessing. However, the use of this structure is not limited to the ME algorithm. Any n-dimensional data processing can use this mechanism to benefit the flexibility and efficiency advantage.

Figure 15:
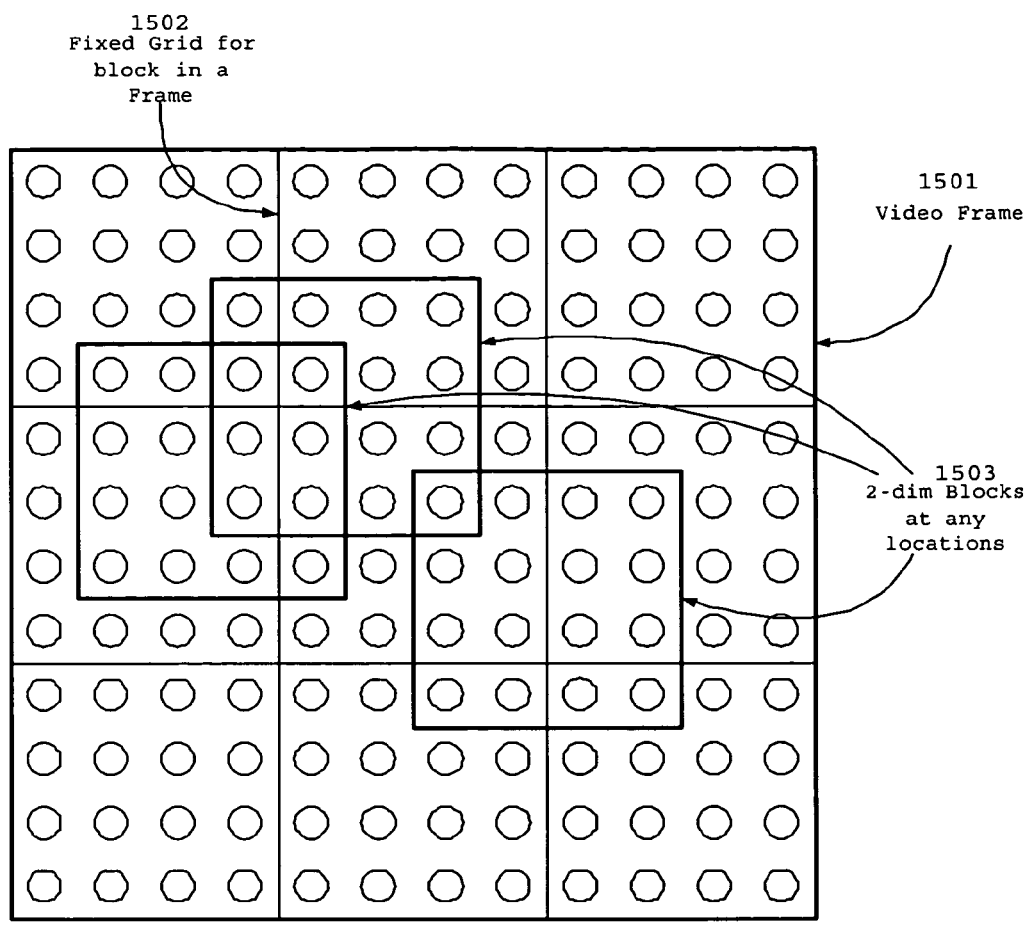
FIG. 15 is a diagram illustrating examples of 2-dimensional frames with fixed grid for block in a frame, and the block access patterns needed any location.

FIG. 15 illustrated this memory access problem. A 2-dimensional case is used in this figure as an example, as in the ME algorithm. In video application, video data is typically arranged in a 2-dimensional frame which shows a picture at any instance on the TV screen. (1501 in FIG. 15) Inside a frame, the data is typically organized in a smaller 2-dimensional blocks. These blocks are usually in a size of 16×16 or 8×8. These blocks are formed with a fixed grid pattern on each frame (1502 in FIG. 15).

In video algorithms, these blocks must be accessed in an efficient way, e.g. get all pixels in a block in 1 single cycle or 1 single burst. In video algorithms, a 2-dimsional block must be accessed at any random location not aligned to the fixed grid, as shown as 1503 in FIG. 15.

Electronic memories (e.g., SDRAM, SRAM, etc.) are organized in a one-dimensional based addressing mechanism that allows at best of simultaneous access/burst of pixels in a linear way, i.e., a row of pixels. With some pre-arrangement of the pixel data allocation in the memory, it is possible to do burst of a block aligned to the fixed grid pattern in the frame. It is, however, not possible to allow access in one cycle/burst of a random located block.

Figure 16:
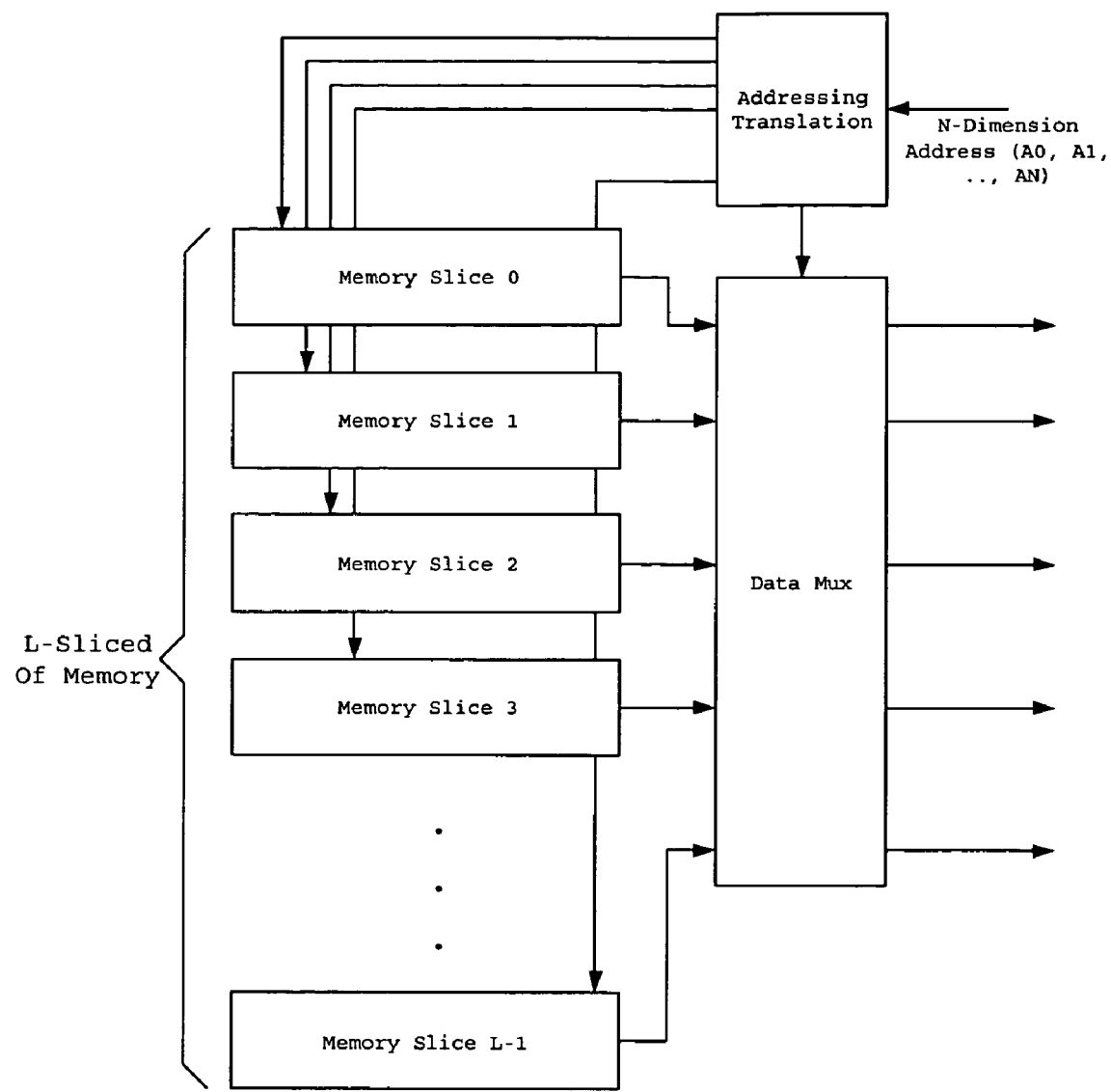
FIG. 16 is a diagram illustrating one embodiment of the N-dimensional memory structure.

The block diagram of one embodiment of the memory structure solution is shown in FIG. 16. In this block diagram, the n-dimensional object memory is separated into L slices. Each of the memory slices is a traditional one-dimensional memory (in SRAM, e.g.). The data width of each slice is the minimal element size of the object. In video, this size is a pixel (of 8 bits, for example.) In other applications, the bus width of the memory slice can be any size. The goal of the L-slice organization is to allow the access to an n-dimensional block in one cycle (if the data block has L elements), or in a burst of multiple access cycles with L elements each. To achieve this, the issue is how the n-dimensional block data allocated into the L slices. We have two criteria for data allocated to each slice:

(1) The data elements belonging to the same block should be evenly allocated into L-slice such that the L data elements in the block can be accessed simultaneously without conflict.
(2) If the number of slice L is less then the number of data element in a block, say B=L*M, where B is the number of elements in a block, then there are multiple elements (M) of a block residing in the same slice. The M data elements should be put in a contiguous range on a slice to enable single burst of block access.

Figure 17:
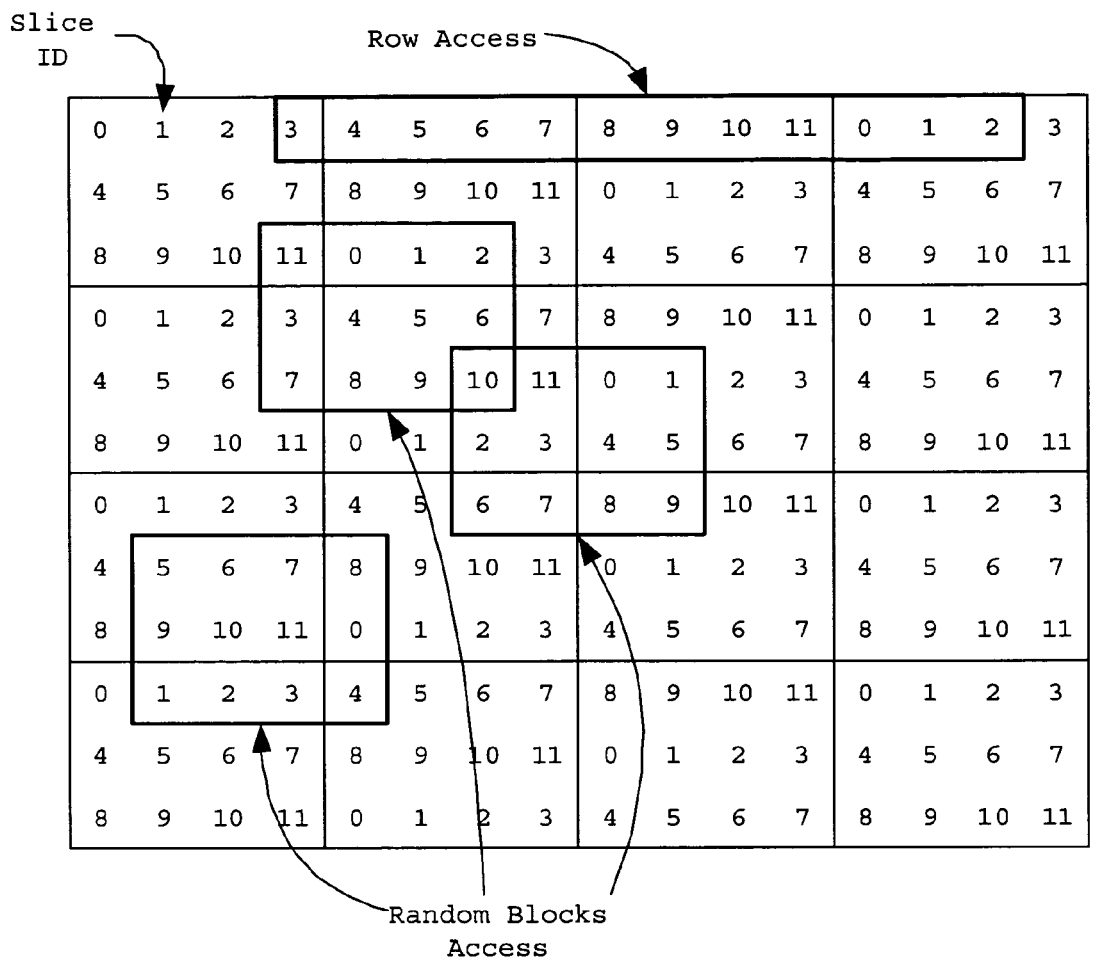
FIG. 17 is a diagram illustrating the slice ID assignment in a 2-dimensional memory to allow accessing a 2-dimensional block at any location in one cycle.
Figure 18:
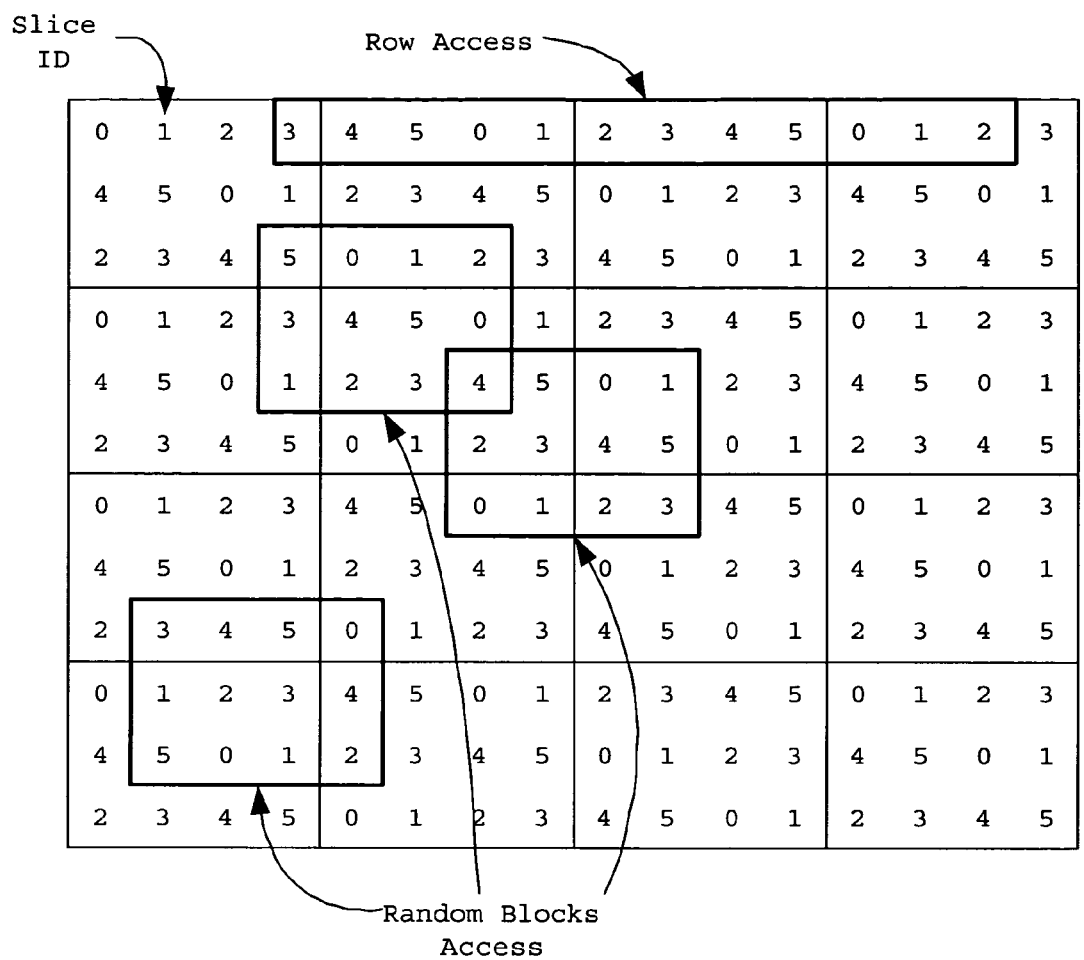
FIG. 18 is a diagram illustrating the slice ID assignment in a 2-dimensional memory to allow accessing a 2-dimensional block at any location in a burst of 2 cycles.

One example of allocating data based on one exemplary method is shown in FIG. 17. In this figure, a 2-dimensional block of 3×4 with L=12 example is shown. In this way, any 3×4 block in the frame can be accessed in one single cycle. Another example with L=6 and M=2 is shown in FIG. 18. In this case, any 3×4 block consists of 2 elements with the same slice memory ID. That is, the 3×4 block can be accessed in 2 clock cycles. In addition, as shown in FIG. 17 and FIG. 18, any access L pixels in a row can be accessed in one clock cycle as well because there are no slice memory duplication in the set of row pixels.

Once the data allocation is completed according to the exemplary method, the address translation and data multiplexing control may be designed to reflect the allocation pattern as shown in FIG. 16.

In one exemplary embodiment, the number of dimensions n, the number of block sizes in each dimension, and the number of memory slices L can all be parameterized to fit any possible cases needed by a particular application.

Multi-Level N-Dimensional Memory Storage

The video ME algorithm has the following unique sets of requirement that differentiates itself from a non-real time CPU system.
1. Large Capacity
2. Large Bandwidth
3. Random Access of 2-dimensional data elements
4. Low Cost Among these requirements, the $2^{nd}$ and the $3^{rd}$ requirements can be solved by the memory mechanism described previously. However, the large capacity and low cost solution may not be met if the n-dimensional storage mechanism is used alone. Besides, a large slice number L provides large access bandwidth while increasing the cost at the same time.

The traditional multi-level cache memory hierarchy can be applied to the N-dimensional memory. The high speed and cost of n-dimensional storage make it most suitable for the innermost level of memory closest to the processing engine.

Figure 19:
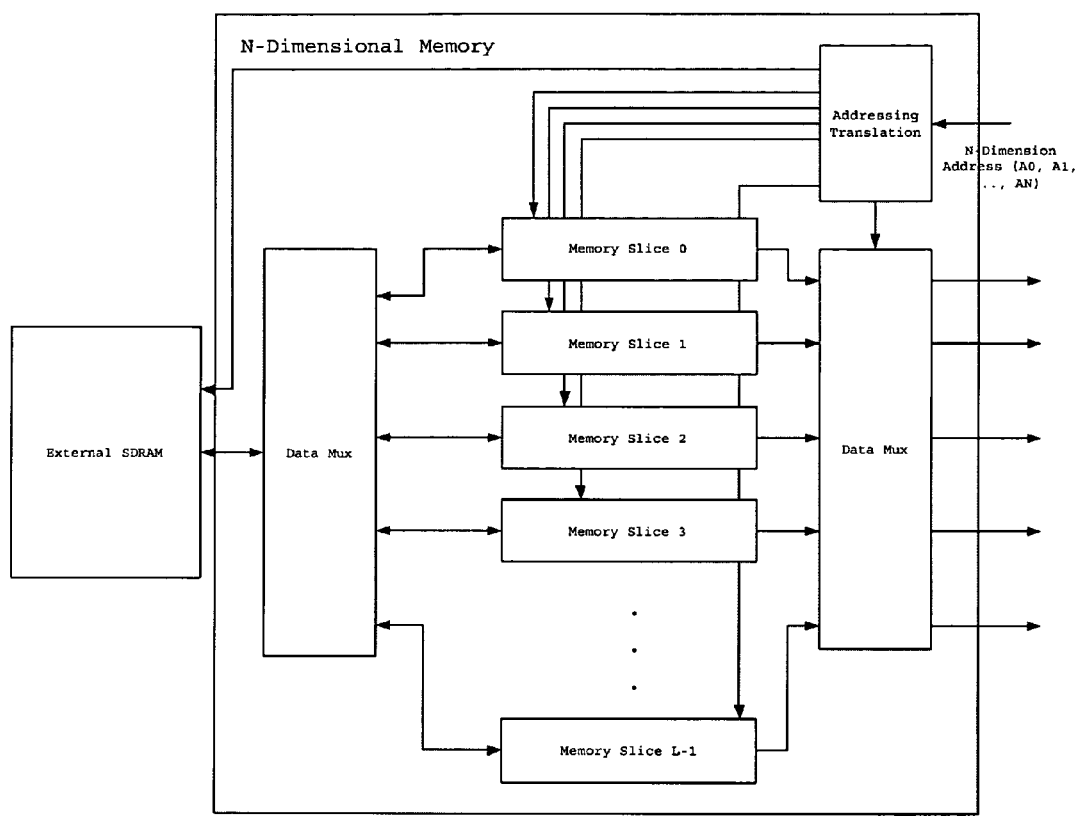
FIG. 19 is a diagram illustrating an embodiment of the multi-level N-dimensional memory using SDRAM as the $2^{nd}$ level external memory storage.

An exemplary 2-level memory embodiment for the n-dimensional storage is shown in FIG. 19. In this mechanism, the data is organized such that the data is first read from the second level memory (e.g., an SDRAM) and stored in the on-chip n-dimensional storage. Once the data is in the n-dimensional storage, the data can be accessed flexibly and reused many time. In this way, the demand on the external SDRAM bandwidth and the access pattern flexibility is reduced.

Figure 20:
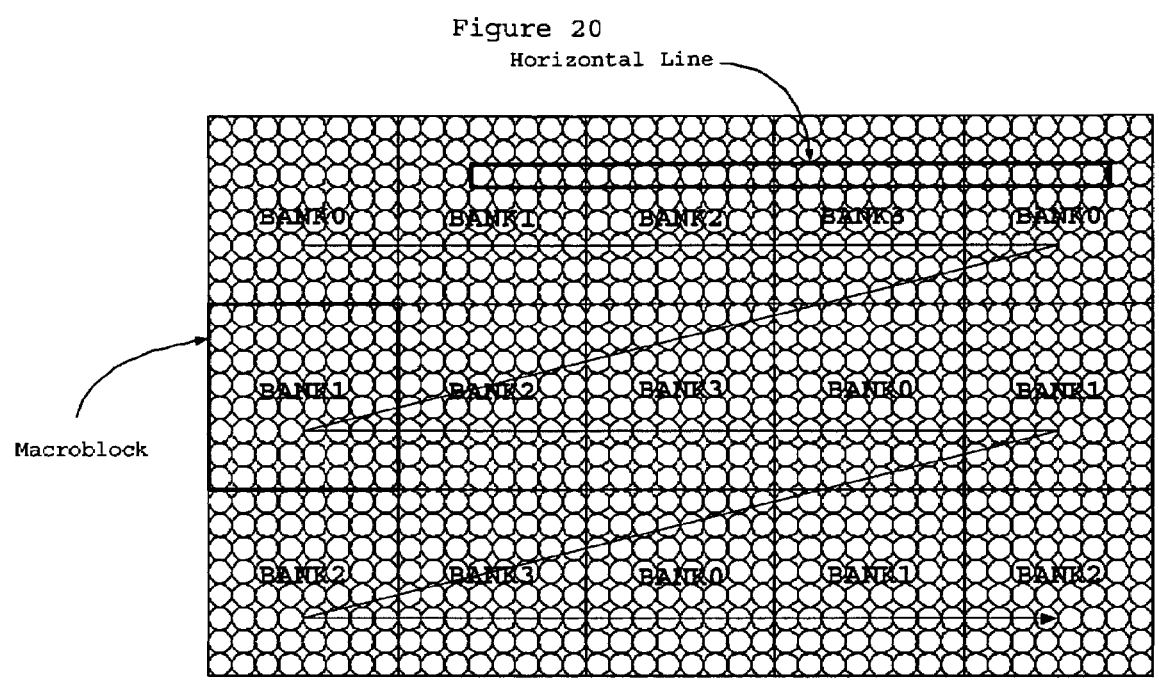
FIG. 20 is a diagram illustrating the 2-dimensional frame data allocation in the $2^{nd}$-level external SDRAM to optimize the 2-dimensional block access performance.
Figure 21:
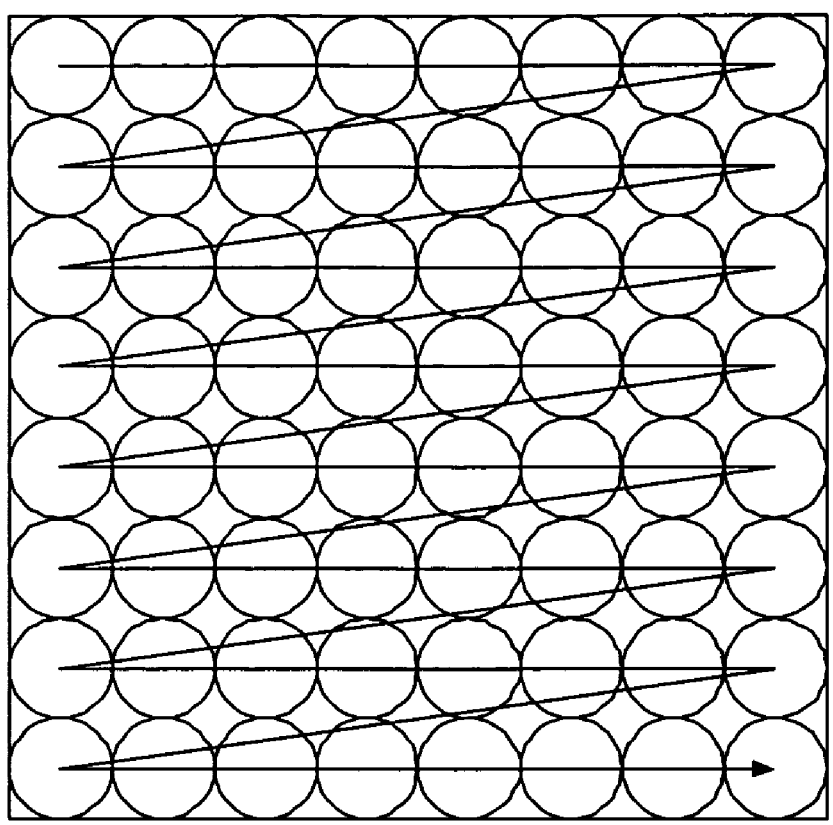
FIG. 21 is a diagram illustrating the data allocation sequence of a 2-dimensional block in a linear $2^{nd}$-level external memory.

When a SDRAM is used as the second level of memory in 2-level n-dimensional storage, some elaboration on the use of SDRAM is needed to support the n-dimensional data structure and overcome the SDRAM architecture limitation. Due to the architecture of a SDRAM design, there are overhead associated with the SDRAM access. Typically, a SDRAM access involves the following operations, each with various delays which incurs overhead between bursts:

(1) Pre-Charge of a previously accessed memory bank
(2) Sending a RAS command.
(3) Sending a CAS command Without a proper arrange of the pixel data, the overhead between burst accesses can be very high. On the other hand, the SDRAM provides memory organization of multiple banks allows command issuing and pre-charge independently. With a proper organization of pixel data of a frame, the SDRAM access overhead can be minimized. To do this, we fixed the frame buffer data allocation pattern in the SDRAM as in FIG. 20. A frame buffer is first pre-partitioned into block of a fixed size (16×16, 8×8, or other fixed size) with each block allocated into one bank of SDRAM memory. The example in FIG. 20 shows 8×8 block. The blocks are aligned to the fixed grid pattern as explained in 1502 FIG. 15. These blocks are arranged sequentially into the sequential bank ID as shown in FIG. 20. Within one block, the pixel data are arranged in the order shown in FIG. 21.

With this, the access patterns to the SDRAM listed in the following are done with zero-overhead:
(1) Block Burst—The whole block is arranged continuously within a bank. Therefore the access of the whole block is done with one single burst.

(2) Sequential Blocks Burst—Multiple blocks burst access in the raster scan order (as shown in FIG. 20) are achieved with multiple bursts. Since each block is allocated into a different bank, these bursts commands are pipelined such that there is no overhead.

(3) Row Access—A row of pixels in the same line can be accessed with multiple bursts. Again, the multiple bursts belongs to different bank, therefore pipelining across burst is possible. Whether there is zero overhead depends on how long is the burst within one block, and depends on CAS and RAS delay of the SDRAM.

Even though the access to the external SDRAM may have a very limited access pattern, the multi-level N-dimensional storage using the SDRAM as the second or higher level of memory allows the access to the data very flexibly once the data is read from the SDRAM to the N-dimensional storage.

Parallel Spiral Pattern (PSP) Array Processors for ME Search

Figure 22:
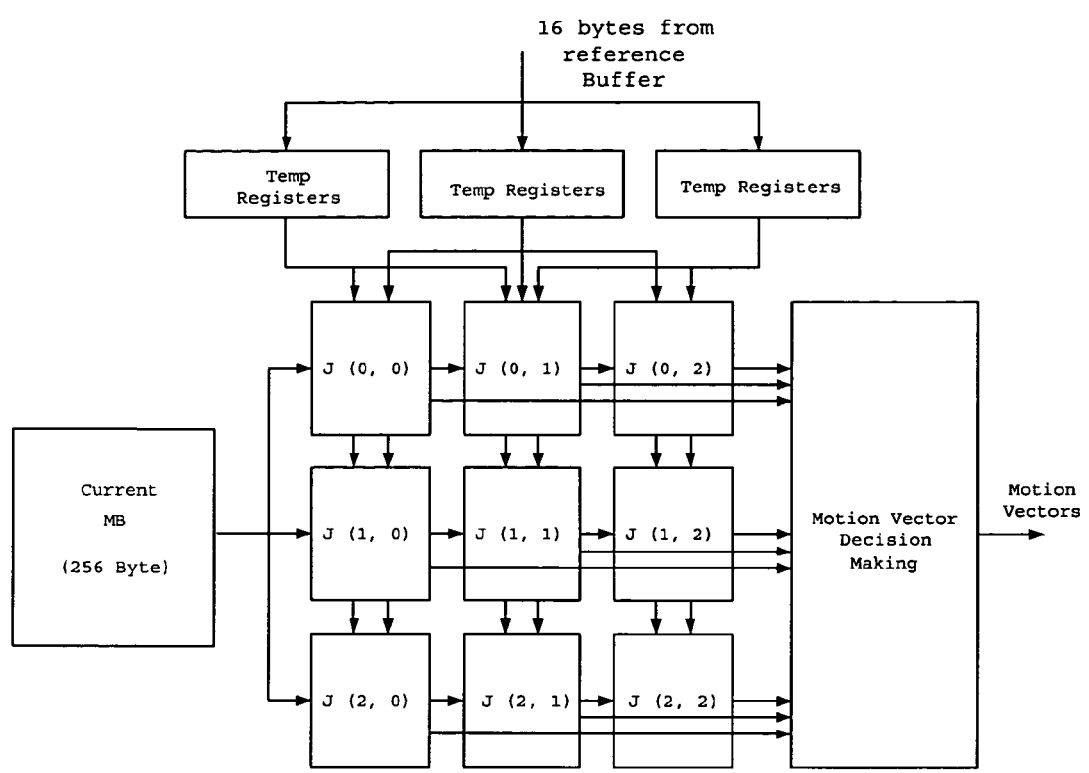
FIG. 22 is a diagram illustrating an embodiment of the PSP array processors for ME search.

In one embodiment, an architecture is proposed to reduce the reference bandwidth need in a ME algorithm using a parallel spiral search pattern and an array-processors. This approach may allow multiple processors to share the same data output from the reference buffer as illustrated in FIG. 22.

Figure 23:
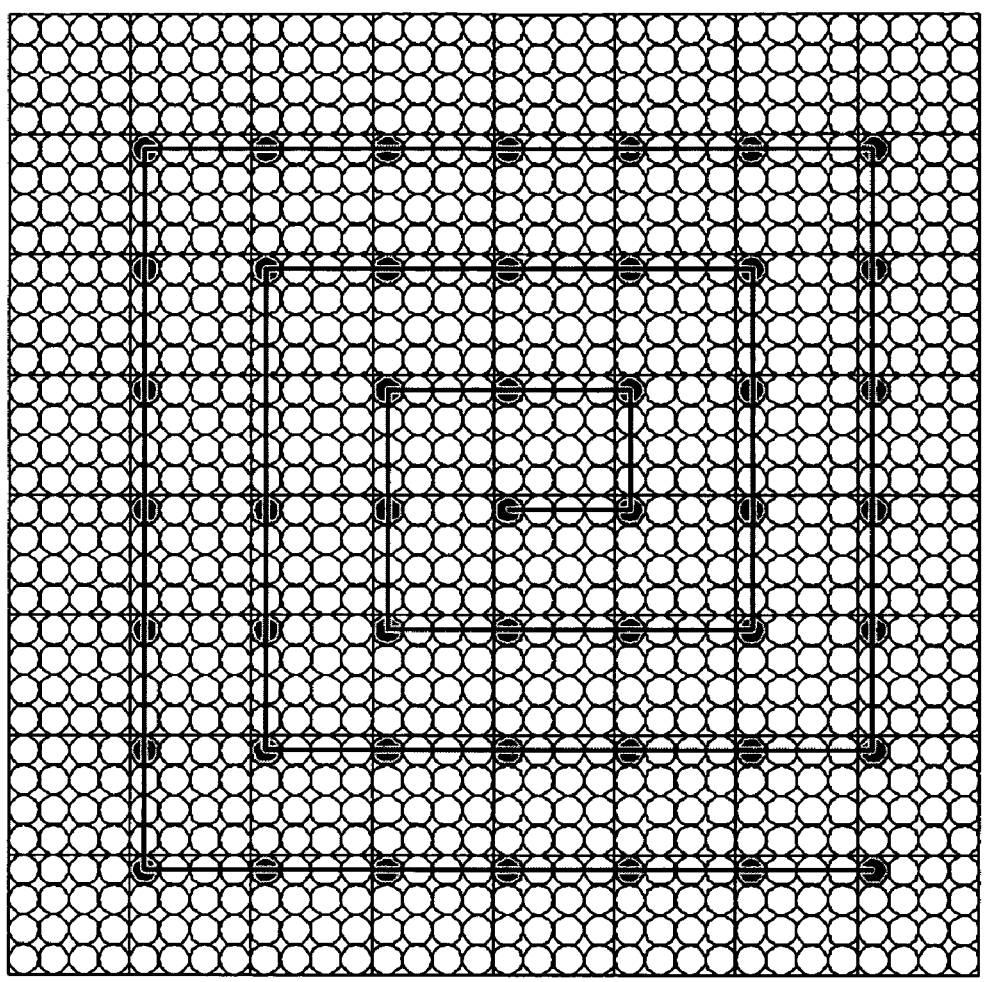
FIG. 23 is a diagram illustrating the single processor spiral search pattern typically used in ME search algorithm.

In one embodiment, the fixed search/access pattern nature in the ME algorithm may be exploited. The way to share the 2-level memory output is to pre-specify the search pattern in the ME algorithm such that multiple search points are done in parallel. Traditionally the ME algorithm uses various algorithms. One implementation uses spiral search that follows a pre-specified search trace until it eventually finds the best search point. FIG. 23 shows a spiral search with a operation size of 4 pixels. In order to allow the parallelism of search with fixed access memory access pattern, this invention uses a search pattern that is "Parallel Spiral Search".

Figure 24:
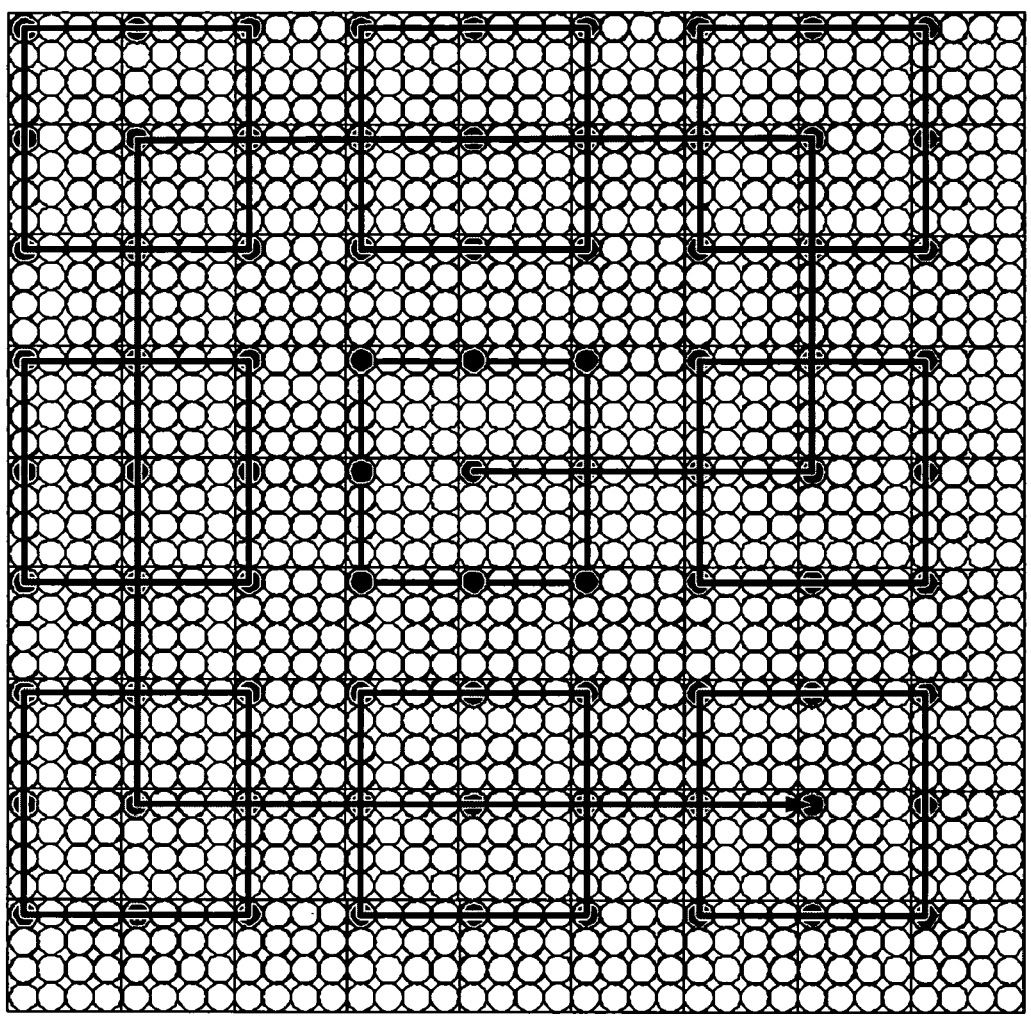
FIG. 24 is a diagram illustrating an example of the parallel Spiral Search pattern with an array of 3×3.

FIG. 24 shows an example of the parallel spiral pattern with P search points in parallel, with P=9 in this example. With the P search points processing in parallel in a fixed, e.g., a 3×3 grid pattern, the input data can be further analyzed to enhance the sharing and reduce the memory bandwidth usage.

Figure 25:
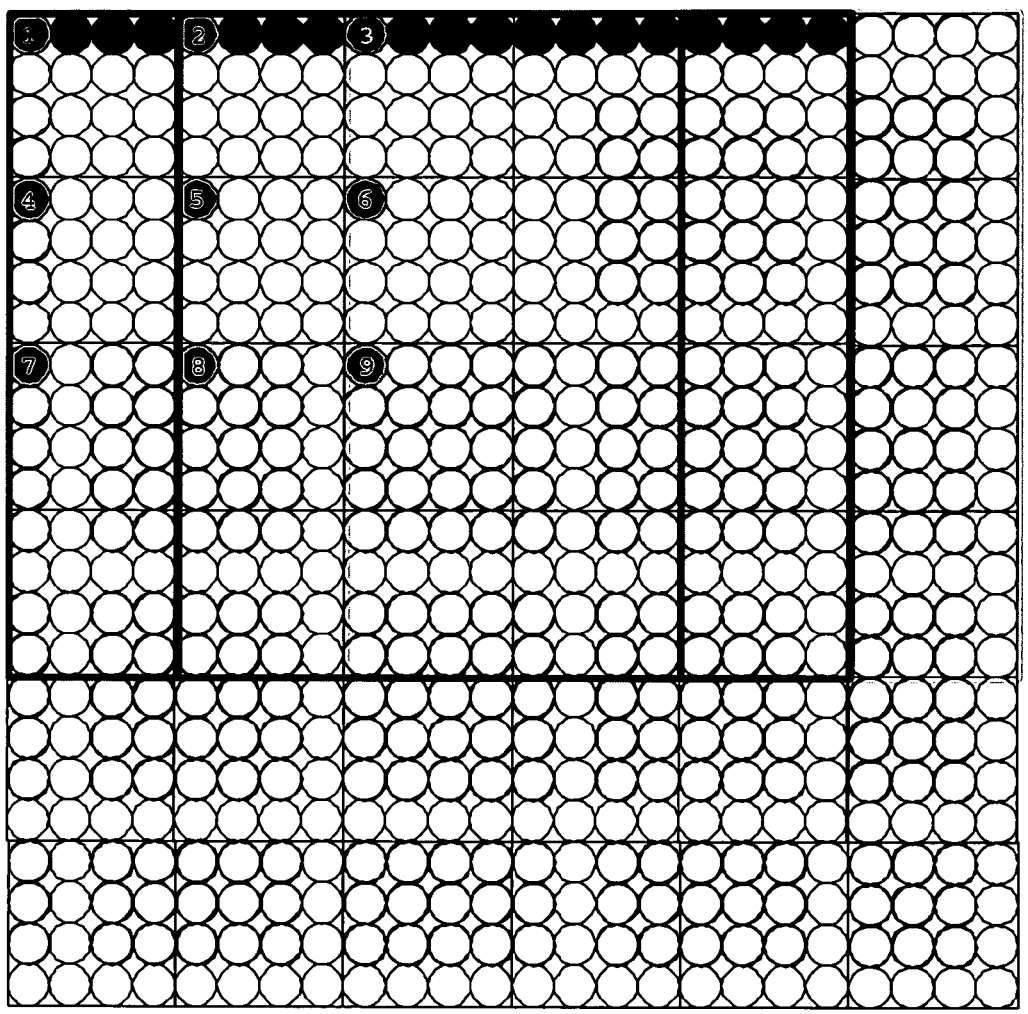
FIG. 25 is a diagram illustrating the data accessing sharing among the 3×3 array processors assuming a traditional linear memory used.

An example of this concept is shown in FIG. 25. Each of the search points in the figure specifies the location where a cost function is to be performed. In this case, it may be assumed that the cost function is based on a 16×16 size block. The search-points 1, 2 and 3 share 16 pixels out of the 24 pixels input in each row. In this way, when the first row is read from the reference buffer, it is shared by all 3 search-points 1, 2, and 3. Starting from row 5, the data is shared by search-points 1, 2, 3, 4, 5, and 6. Starting from the 9$^{th}$ row is shared by all 9 search-points. Since the 9 search-points are arranged in a fixed 3×3 grid, the access pattern for reference buffer is fixed and easily designed to reuse the data when it is read out from the buffer.

Note that in this array processing architecture based on the parallel spiral search pattern, the search pattern operation-size, the array size in x and y dimension are all parameters that can be set to any value.

PSP Array Processors with N-Dimensional Memory for ME Search

Alternately, the PSP array processor can also go in a column of data, or a block of data (e.g., 4×4) if an n-dimensional memory is used with the parallel spiral array processor. An embodiment of this combination is shown in FIG. 26.

The use of parallel spiral array processor with the n-dimensional storage may result in a better performance. Without the n-dimensional storage, only a row or column of data is read and shared by the array processor. Let's assume the reference buffer has a data width of 16 pixels providing input data of 16 pixels at a time. Consider the case in FIG. 25. If there is no N-dimensional storage available, only a row or a column of 16 pixels are read at a time. To access the total of 24 rows of 24 pixels each, 48 cycles is needed and is shared by 9 processors. In this way, the number of cycles per processor is 48/9=5.33.

Figure 26:
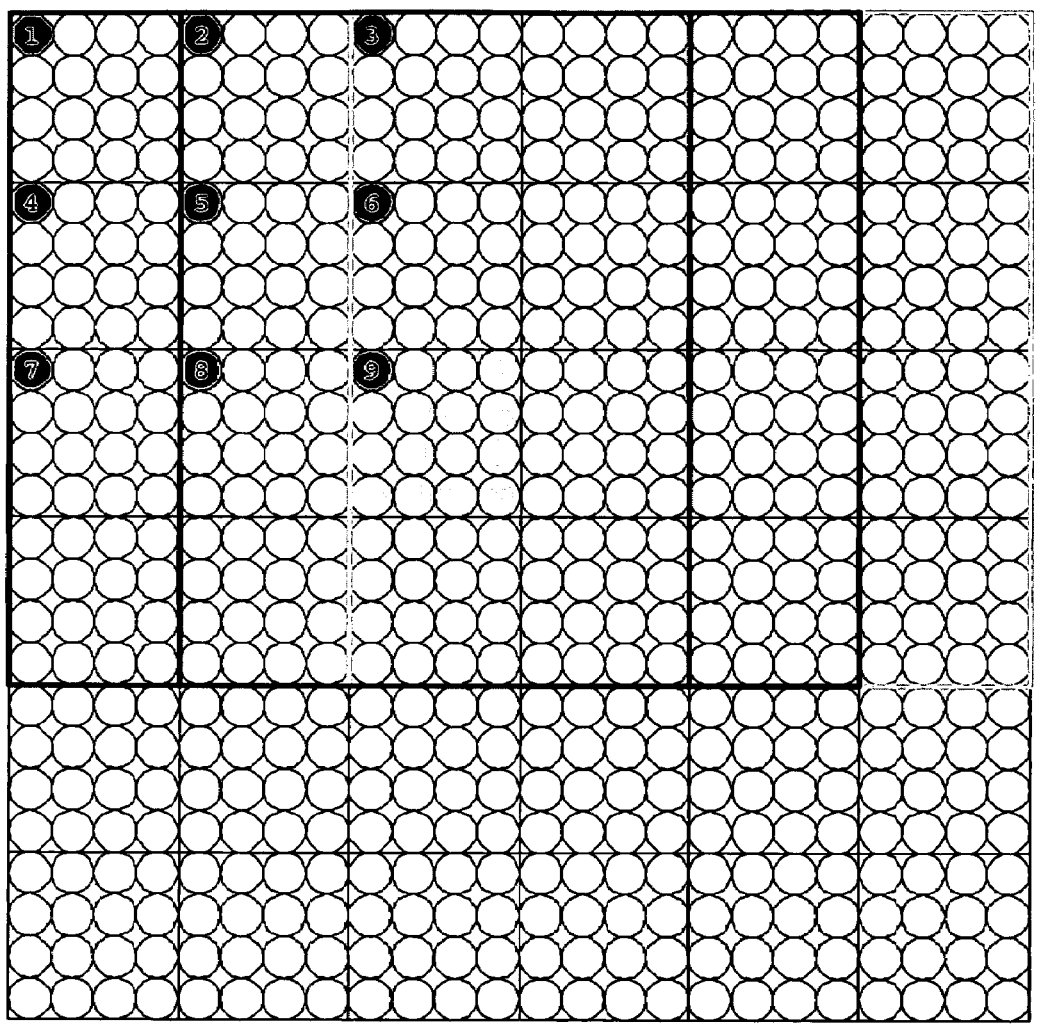
FIG. 26 is a diagram illustrating the data access sharing among the 3×3 array processors assuming a 2-dimensional memory used.

If an N-dimensional storage is available to allow access of a 4×4 block in one cycle as shown in FIG. 26, total of 36 cycles is needed. The number of cycle per processor in this case is 36/9=4. Note that without the PSP and array processor, the number of cycle is 16 cycles per processor. The performance improves from 16 to 5.33 for PSP processor alone, and to 4 for PSP with N-dimensional storage. In all, the array processor architecture can be used alone, or with the N-dimensional memory as described here. The usage of the parallel spiral pattern with array processor with the 2-level memory may enable a more efficient implementation of ME algorithm to search many more points as compared with traditional single spiral point search pattern, and therefore achieve a higher compression performance.

Note also that embodiments of the present description may be implemented not only within a physical circuit (e.g., on semiconductor chip) but also within machine-readable media. For example, the circuits and designs discussed above may be stored upon and/or embedded within machine-readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, method and system for adaptive multi-dimensional signal sequences encoding and decoding, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system to process a signal sequence, the system including:
a differentiator to receive a signal sequence, the signal sequence including an n-dimensional current frame including a plurality of current frame blocks and a plurality of n-dimensional reference frames, each frame from the plurality of n-dimensional reference frames including a plurality of reference frame blocks;

a frame buffer to store the plurality of n-dimensional reference frames;

a block matching predictor to identify a prediction block of the plurality of reference frame blocks for each block in the plurality of current frame blocks, and to determine a reference displacement index and a block prediction difference for a respective prediction block for each block in the plurality of current frame blocks, wherein the reference displacement index is to identify a point within the reference frame blocks;

a block encoder to encode a respective block prediction difference and a respective reference displacement index for each block in the plurality of current frame blocks, and to thereby create a plurality of encoded blocks; and a sequence encoder to multiplex the plurality of encoded blocks together in accordance with a predetermined format;

a cost estimation component to determine computational intensity of the identifying of the prediction block, the cost estimation competent utilizing a cost function J, wherein the cost function J is in the form of $$J = R_{dc}(DC) + R_{ac}(AC) + R_{ri}(\text{reference index}),$$

wherein the $R_{dc}(DC)$ is a rate for the DC coefficient of the block prediction difference; the $R_{ac}(AC)$ is a rate for the AC coefficients of the block prediction difference; and the $R_{ri}$ (reference index) is a rate for the reference index.

2. The system of claim 1, including: a sequence decoder to demultiplex the plurality of encoded blocks in accordance with the predetermined format; and a block decoder to decode each block from the plurality of encoded blocks utilizing a respective block prediction difference and a respective reference displacement index.

3. The system of claim 1, wherein the prediction block is identified so as to minimize an amount of information needed to encode a current frame block utilizing the plurality of reference frame blocks.

4. The system of claim 1, wherein the cost estimation component is to utilize an estimation based on one or more parameters selected from a group including a linear combination of a plurality of characteristic values of the block prediction difference and one or more states of the block matching predictor.

5. The system of claim 1, wherein the cost function is based on at least one table lookup with table entries specified by characteristic values of the block prediction difference and one or more states of the block matching predictor.

6. The system of claim 3, wherein the amount of information needed to encode the current frame block utilizing the plurality of reference frame blocks is determined by the sum of a bit rate for a respective block prediction difference and a bit rate for a respective reference displacement index.

7. The system of claim 1, wherein the $R_{ac}(AC)$ can be estimated as a function of AC_NORM ($R_{ac}(AC\_NORM)$), wherein the AC_NORM is the NORM of the AC component of the block prediction difference.

8. The system of claim 7, wherein the $R_{ac}(AC\_NORLM)$ is a linear function of the AC_NORM or a piece-wise linear function of the AC_NORM.

9. The system of claim 8, wherein the $R_{ac}(AC\_NORM)$ is of the form $$R_{ac}(AC\_NORM) = K*(AC\_NORM - AC\_THRESHOLD)/QP\_ac$$

wherein the AC_THRESHOLD can optionally be removed from the estimation.

10. The system of claim 9, wherein the K can be adjusted by least mean square (LMS) algorithm based on an actual rate, such that $$\Delta K = \mu * Error * (AC\_NORM - AC\_THRESHOLD)/QP\_ac$$

wherein the Error is the rate estimation error and the $\mu$ is a learning factor, and the Error=Actual_AC_Rate−$R_{ac}$(AC_NORM).

11. The system of claim 9, wherein the AC_THRESHOLD can be adjusted utilizing the actual AC Rate and the AC_NORM.

12. The system of claim 7, wherein the AC_NORM is L1 NORM, the L1 NORM being the sum of absolute value of each component of the block prediction difference.

13. The system of claim 7, wherein the AC_NORM is L2 NORM, the L2 NORM being the square root of the sum of the square of each component of the block prediction difference.

14. The system of claim 1, wherein the system is adapted for use in encoding two-dimensional video sequences.

15. The system of claim 1, wherein the block matching predictor is to evaluate system objectives on multiple points in the reference frame utilizing a processor array, the processor array including one or more signal processing units to process n-dimensional data inputs.

* * * * *